United States Patent [19]

Coppa

[11] Patent Number: 4,878,286

[45] Date of Patent: Nov. 7, 1989

[54] TRUSS STRUCTURE AND METHOD FOR CONSTRUCTION THEREOF

[75] Inventor: Anthony P. Coppa, Merion, Pa.

[73] Assignee: General Electric Company, King of Prussia, Pa.

[21] Appl. No.: 240,012

[22] Filed: Sep. 2, 1988

Related U.S. Application Data

[62] Division of Ser. No. 123,077, Nov. 19, 1987, Pat. No. 4,829,739, which is a division of Ser. No. 808,602, Dec. 12, 1985, Pat. No. 4,803,824.

[51] Int. Cl.[4] .................. B23Q 3/10; E04H 12/18
[52] U.S. Cl. .................................. 29/467; 29/429; 52/646
[58] Field of Search .............. 29/155 R, 429, 430, 29/467; 52/637, 638, 646, 648, 693; 403/171, 174

[56] References Cited

U.S. PATENT DOCUMENTS

| | | |
|---|---|---|
| 407,993 | 7/1989 | Bullock . |
| 714,402 | 11/1902 | Sager et al. . |
| 2,940,709 | 6/1960 | Neuwirth . |
| 3,220,152 | 11/1965 | Sturm . |
| 3,221,464 | 12/1965 | Miller . |
| 3,272,540 | 9/1966 | Glanzer . |
| 3,563,580 | 2/1971 | Black . |
| 3,722,153 | 3/1973 | Baer . |
| 3,789,562 | 2/1974 | DeChicchis et al. . |
| 4,069,832 | 1/1978 | Bingham . |
| 4,259,821 | 4/1981 | Bush . |
| 4,308,699 | 1/1982 | Slysh . |
| 4,337,560 | 7/1982 | Slysh . |
| 4,437,288 | 3/1984 | Foissac et al. . |
| 4,450,851 | 5/1984 | Beavers . |
| 4,480,418 | 11/1984 | Ventrella .................... 403/171 X |
| 4,557,097 | 12/1985 | Mikulas, Jr. et al. . |
| 4,580,922 | 4/1986 | Coppa . |
| 4,601,152 | 7/1986 | Coppa . |
| 4,602,470 | 7/1986 | Stuart et al. . |
| 4,633,566 | 1/1987 | Coppa . |
| 4,637,193 | 1/1987 | Lange . |
| 4,646,504 | 3/1987 | Britvec . |
| 4,803,824 | 2/1989 | Coppa ........................ 52/693 X |

FOREIGN PATENT DOCUMENTS

| | | |
|---|---|---|
| 1958878 | 6/1971 | Fed. Rep. of Germany ...... 403/171 |
| 6716751 | 6/1968 | Netherlands . |
| 476429 | 12/1937 | United Kingdom . |
| 609912 | 10/1948 | United Kingdom . |

OTHER PUBLICATIONS

"Building on Space's Potential," *U.S.A. Today*, Nov. 29, 1985, p. 3A.

Primary Examiner—Timothy V. Eley
Assistant Examiner—Peter Dungba Vo
Attorney, Agent, or Firm—Raymond E. Smiley; Clement A. Berard, Jr.

[57] ABSTRACT

A truss structure for use in a gravity-free environment is disclosed together with methods and apparatus for constructing the same. The structure, characterized by high stiffness and a precise self-determined geometry and having a prism-form with square right cross section, is constructed from a plurality of substantially identical triangular frame elements. The truss structure may be manually constructed from a multi-row chain of interconnected elements or from a four row network of elements. The structure may also be constructed using an automatic method wherein individual frame elements are fed from four stack support and feed units to a holding fixture having a square cross section.

10 Claims, 19 Drawing Sheets

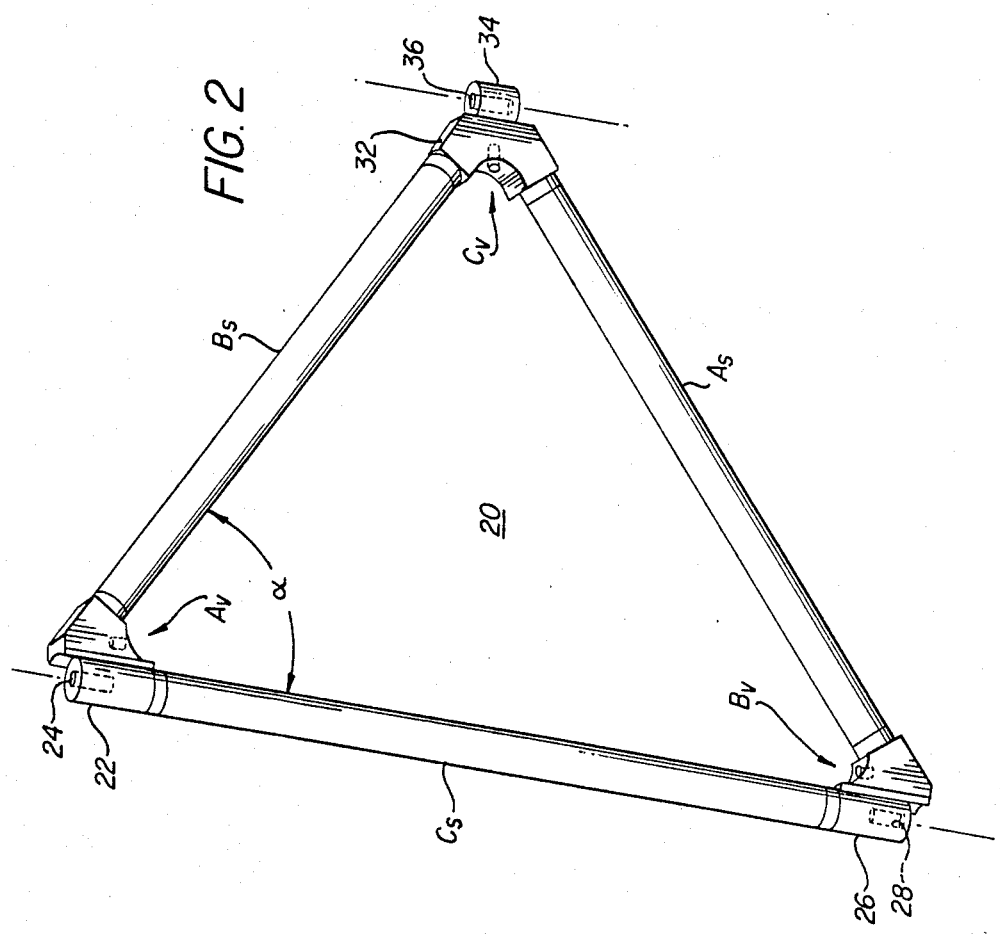

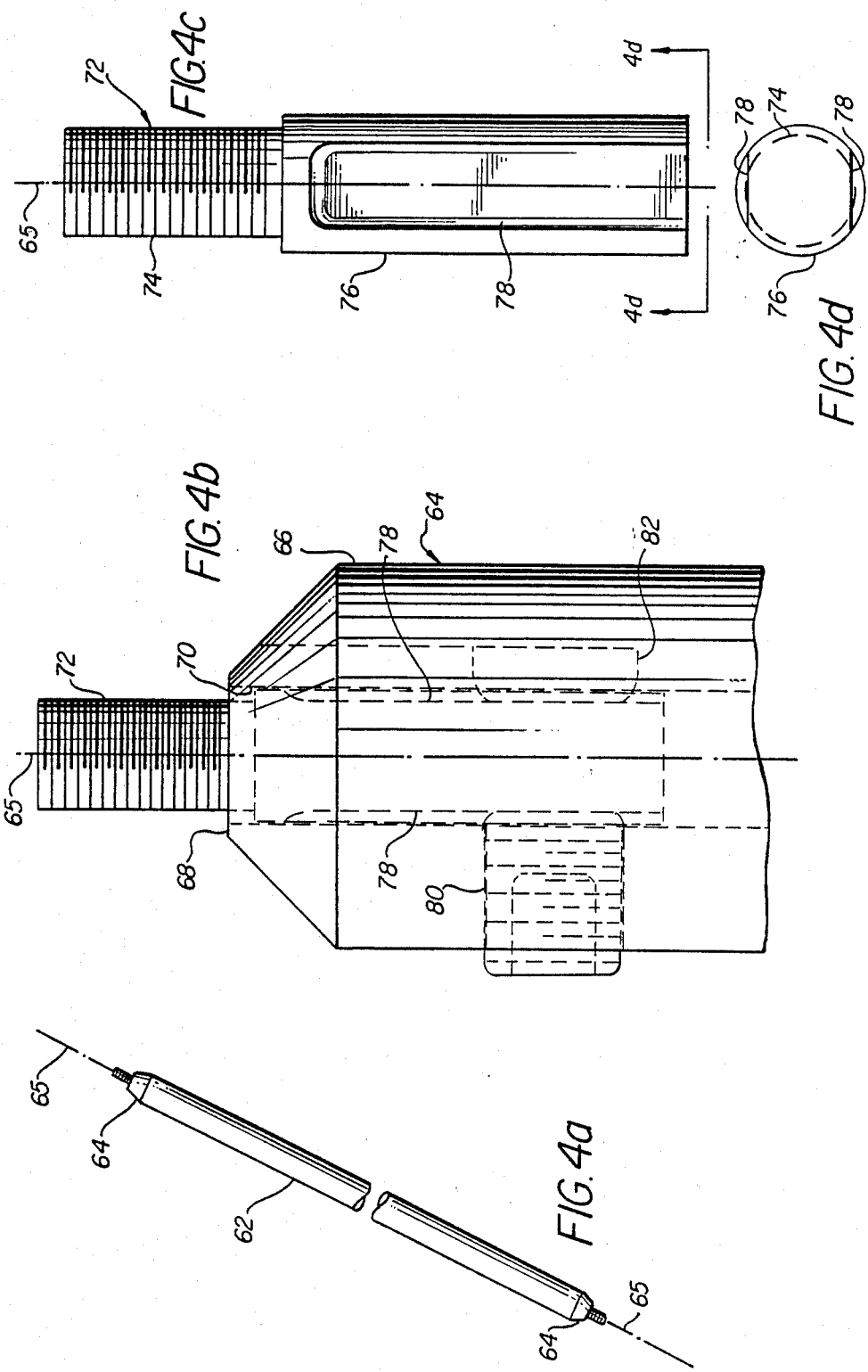

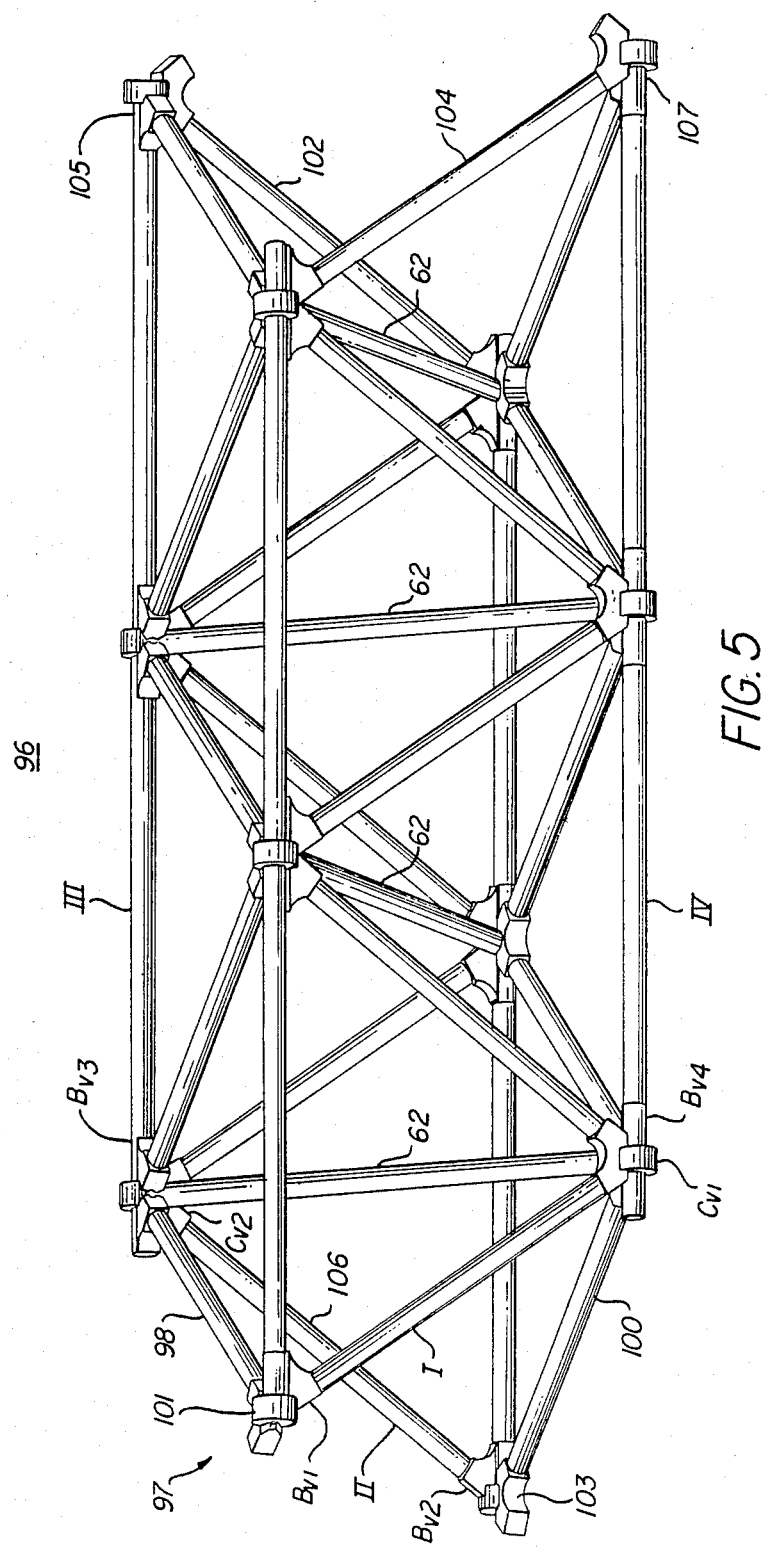

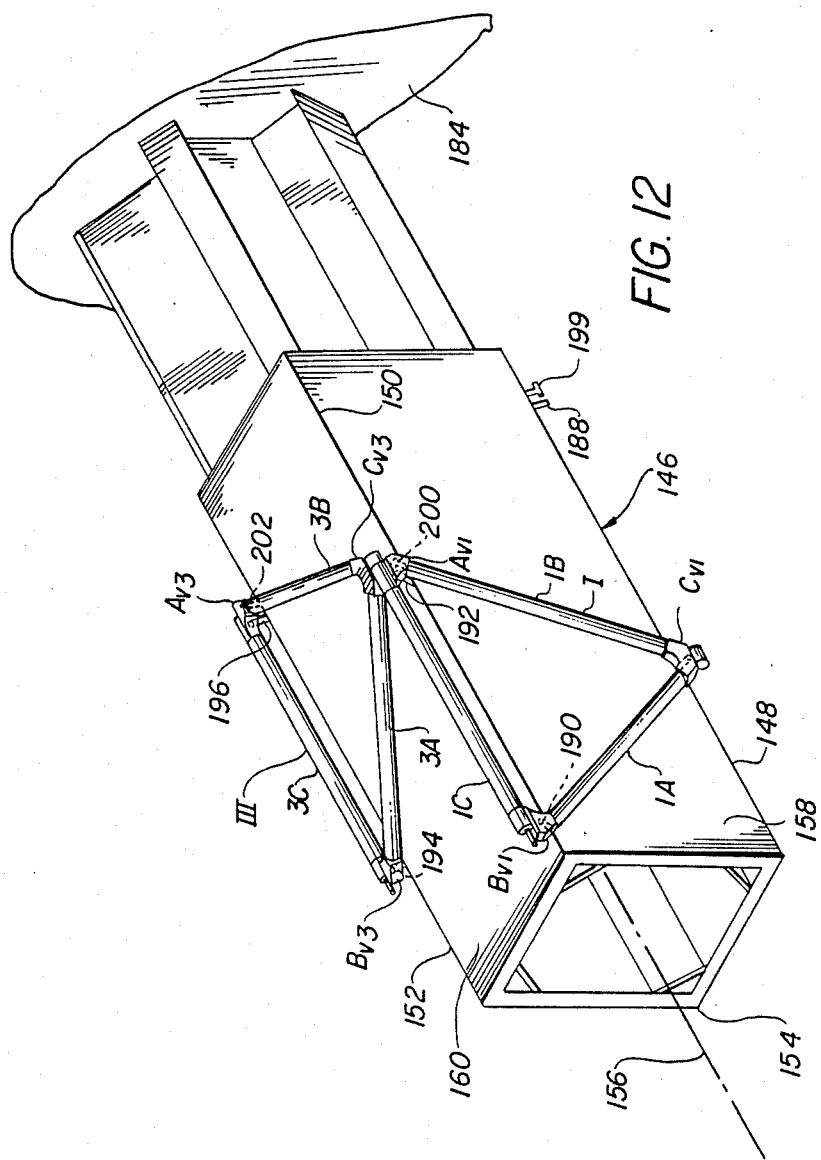

TRUSS STRUCTURE AND METHOD FOR CONSTRUCTION THEREOF

This is a division of application Ser. No. 123,077, filed 11/19/87, now U.S. Pat. No. 4,829,739, which is a division of application Ser. No. 808,602, filed 12/12/85, now U.S. Pat. No. 4,803,824.

The present invention relates in general to truss structures and to apparatus and methods for constructing and disassembling the same in a gravity-free environment.

BACKGROUND OF THE INVENTION

Because of their structural efficiency, certain forms of structures are preferred where considerations of size, weight and transportability are important. Among these are truss structures, which have a high stiffness-to-weight ratio and a simple, self-determined geometry. Since the size of these structures precludes their transport over long distances, minimum packing volume and weight are important factors.

Among the requirements that govern the design of such structures is the use of components that can be easily handled with a minimum amount of labor and effort. However, structures which comply with this requirement by automatically unfolding and positioning themselves in a gravity-free environment are generally not efficient and carry a weight penalty because of the self-deployment feature. Additionally, it is desirable that the methods and the apparatus used for construction and disassembly be both simple and automated to the maximum possible extent in order to minimize the requirement for human intervention. However, structures which are capable of automated construction at a remote site often fail to achieve the necessary stiffness-to-weight ratio, stowage efficiency and the requisite simplicity of the method and apparatus used for assembly. Also, while it would otherwise be preferred, existing structures of the type discussed are typically incapable of construction and disassembly at a single general location and require the equipment in use, as well as construction performed, to move along the structure as the latter grows or diminishes in size during assembly or disassembly respectively.

By way of example, U.S. Pat. No. 4,259,821 to Bush discloses a truss structure, formed from structural columns, which does not lend itself to an automated assembly method because of its complexity. U.S. Pat. No. 4,337,560 to Slysh discloses a structure that lends itself to an automated assembly technique. However, such a structure is not capable of being constructed from a single general location and it requires an assembler trolley which crawls along the structure as the structure is built up during construction.

OBJECTS OF THE INVENTION

It is principal object of the present invention to provide a new and improved space-erectable structure and construction methods therefor which are not subject to the aforementioned problems and disadvantages.

Another object of the present invention is to provide a truss structure having a high stiffness-to-weight ratio and which is constructed of identical repeating elements.

A further object of the present invention is to provide a truss structure comprising discrete elements which can be efficiently stowed in a small packing volume prior to construction.

An additional object of the present invention is to provide a truss structure which has a precise, self-determined geometry based on a plurality of identical, repeating structural elements.

Yet another object of the present invention is to provide a simplified assembly method for constructing a truss structure in space.

Yet a further object of the present invention is to provide apparatus and automated methods for constructing and/or disassembling a truss structure in a gravity-free environment.

Yet an additional object of the present invention is to provide physically compact apparatus for carrying out the automated construction of a truss structure in a gravity-free environment.

Still a further object of the present invention is to provide apparatus and methods for constructing a truss structure in a gravity free environment from a single, general location.

SUMMARY OF THE INVENTION

The foregoing objects of the present invention are achieved through a new and improved prism-form truss structure and apparatus for erecting the same. A plurality of congruent, planar, triangular frame elements are interconnected at the element vertices to form a prism-form truss structure having a square right cross section, which further includes diagonal struts transverse to and spaced along the longitudinal axis of the truss structure.

In accordance with the present invention, the aforesaid truss structure may be constructed manually from a chain of interconnected frame elements. The chain is folded by rotation about selected, mutually aligned sides of the interconnected elements until the complete truss structure is formed. In an alternative manual construction method, an element network comprising four rows of frame elements of equal, predetermined length is used.

The truss structure may also be constructed by using apparatus and an automated method wherein individual frame elements are fed from four stack support and feed units to a holding fixture having a square cross section. As the truss structure is built around the fixture, the structure is periodically advanced in an axial direction with respect to the fixture to allow further truss sections to be added.

BRIEF DESCRIPTION OF THE DRAWINGS

FIG. 2 is a plan view of a frame element of the type used in the construction of the truss structure of FIG. 1;

FIGS. 4a, 4b and 4c illustrate different views of a preferred diagonal strut for use in the truss structure;

FIG. 4d is a cross-sectional view of the strut of FIG. 4c;

FIG. 5 illustrates a variation of the structure shown in FIG. 1 having puckered ends;

FIG. 12 illustrates the construction fixture of FIG. 10 with frame elements positioned thereon;

DESCRIPTION OF THE DRAWINGS

Figure 1:
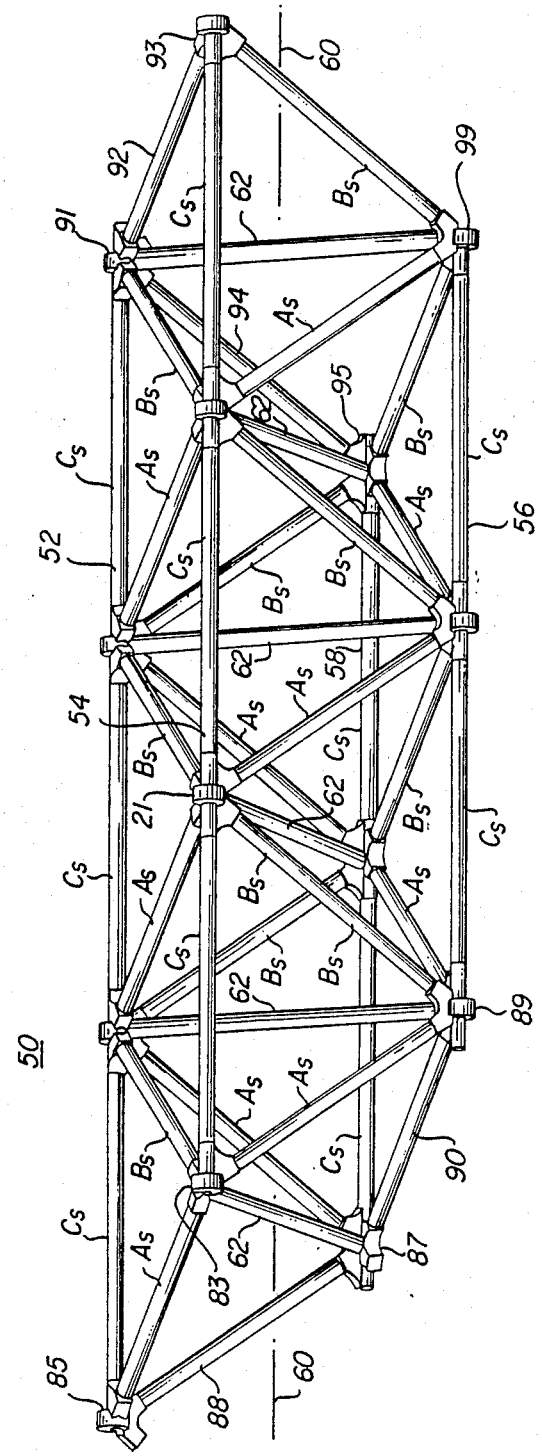
FIG. 1 is an isometric view of an exemplary truss structure in accordance with the present invention.

Referring now to the drawings, an exemplary truss structure 50 in accordance with a preferred embodiment of the present invention is illustrated in FIG. 1 and comprises a plurality of substantially identical triangular frame elements of the type shown in FIG. 2. Each frame element 20 is substantially planar and consists of an A-side $A_S$, a B-side $B_S$ and a C-side $C_S$, located opposite an A-vertex $A_v$, a B-vertex $B_v$ and a C-vertex $C_v$, respectively. In a preferred embodiment of the present invention, each side comprises a substantially linear strut member. Each of the three vertices includes a different type of vertex fitting capable of fastening respective frame elements to one another.

In accordance with the present invention, the included angle $\alpha$ at vertex $A_v$ is limited to a value of less than 90°. Angle $\alpha$ is related to the length B of a B-side and the length C of a C-side by $$\cos \alpha = NC/4B$$

where N is an integer greater than 1. For values of N greater than 2, the formula defines either scalene triangular elements, or isosceles triangular elements if B=C, from which the truss structure of the present invention may be constructed. In accordance with a preferred embodiment of the invention, N=2 to define isosceles triangular elements wherein sides $A_S$ and $B_S$ are substantially equal in length and wherein length $C = 2B/\sqrt{3}$. For the sake of illustration only and without so limiting the invention, the truss structure of FIG. 1 is illustrated as being constructed from ten of the aforesaid preferred elements.

Figure 3A:
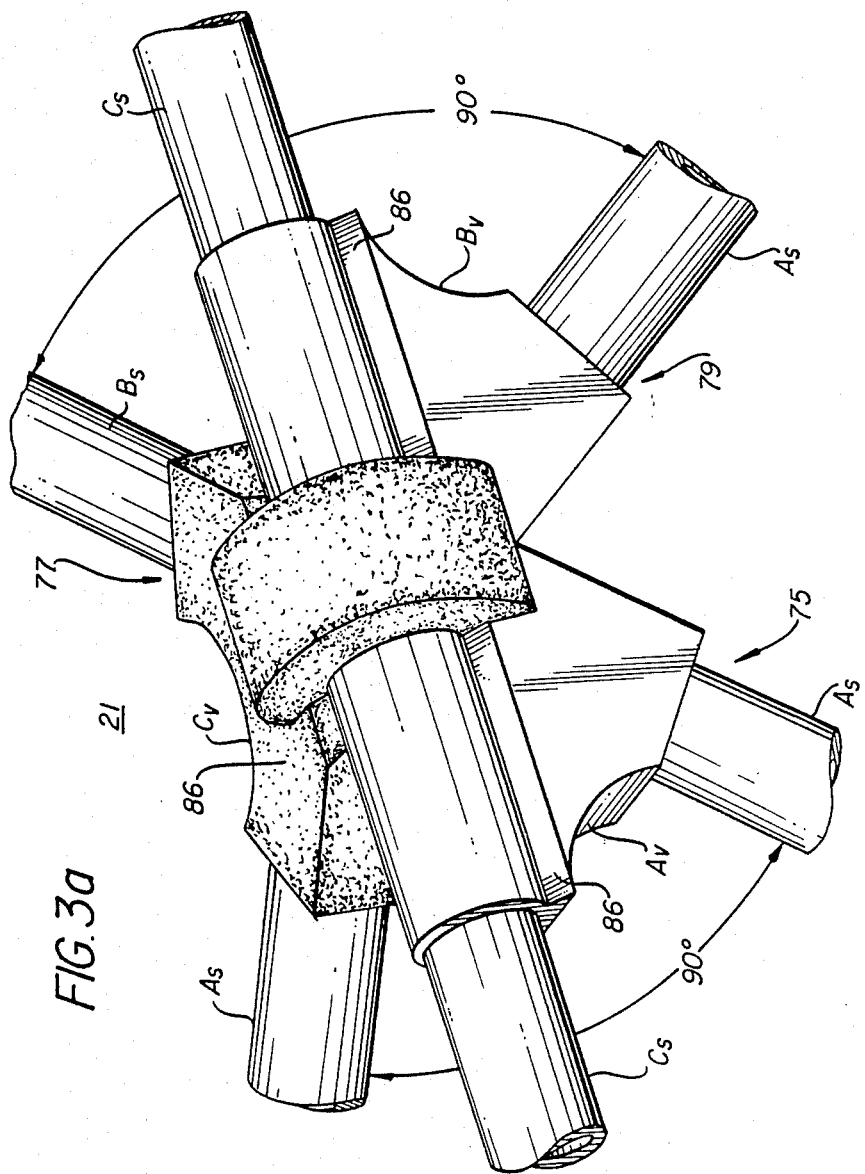
FIGS. 3a and 3b illustrate a preferred truss joint.
Figure 3B:
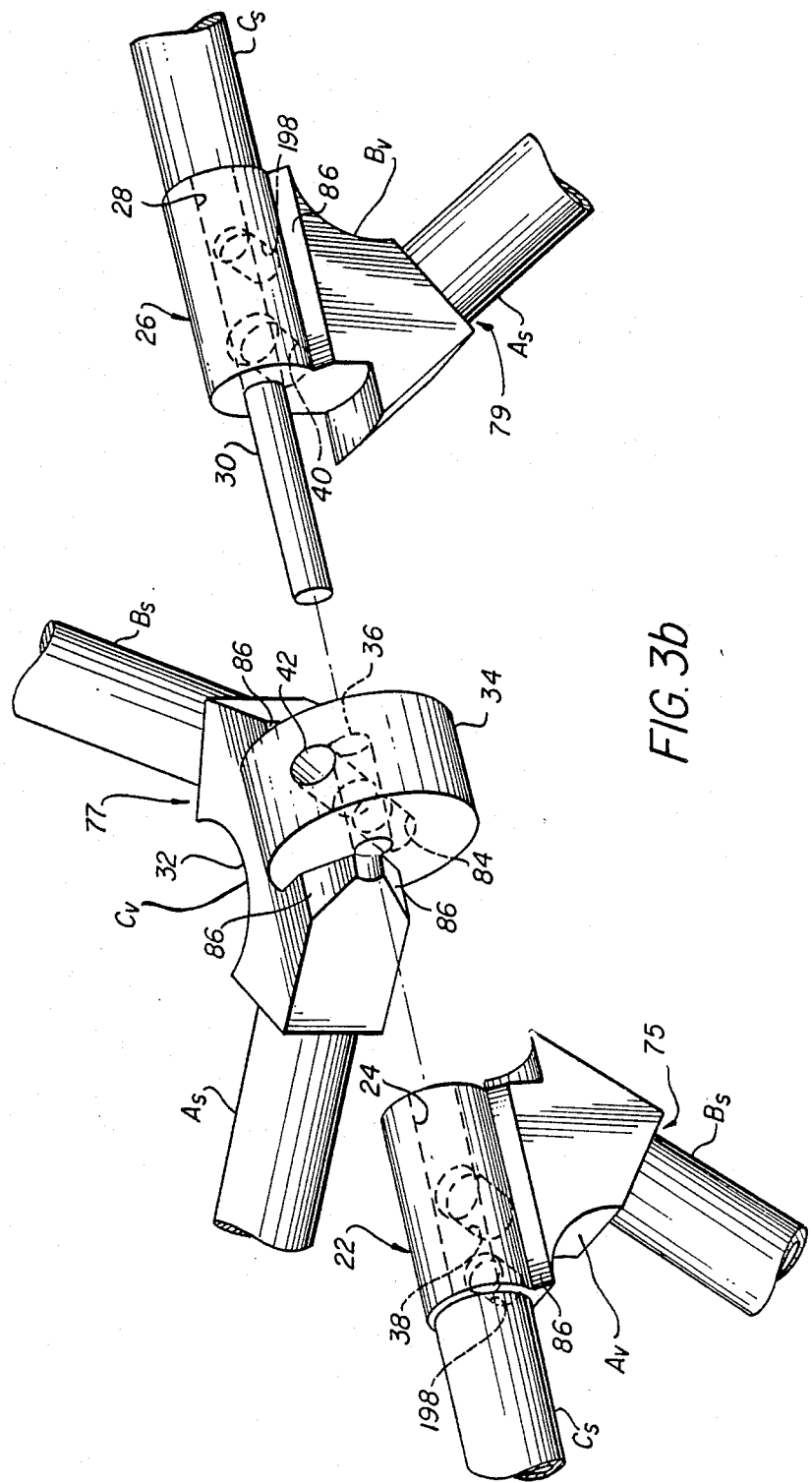

A joint 21 of truss structure 50 (FIG. 1), where three frame elements of the truss are joined, is shown in FIG. 3a broken away from the structure. Vertex $C_v$ is shaded for the sake of illustration only, in order to distinguish it from vertices $A_v$ and $B_v$ to which it is joined. FIG. 3b shows an exploded view of joint 21 wherein vertex $A_v$ comprises a fitting 22 which includes a socket 24. Vertex $B_v$ comprises a fitting 26, which includes a socket 28 and a fastening pin 30 shown fixed in the socket. Vertex $C_v$ comprises a fitting 32 which includes a tab 34 containing a through hole 36. Pin 30 need not be fixed in vertex $B_v$ and in fact may be fixed in either vertex $A_v$ or $C_v$ depending on the method of construction used. As can be seen in FIG. 2, the axis of through hole 36 is parallel to that of side $C_s$. The respective axes of sockets 24 and 28 are coincident and aligned with the axis of side $C_s$.

Each hinged joint of the truss comprises the A-, B- and C-vertices of three different frame elements which are fastened together. As seen in FIG. 3b, irrespective of the fitting in which the fastening pin is initially fixed, the pin aligns with and engages through hole 36 in vertex fitting 32, socket 24 in vertex fitting 22 and socket 28 in vertex fitting 26.

As seen in FIG. 3b, beveled surfaces 86, positioned on opposite sides of each fitting, are respectively inclined at an angle of approximately 45° with respect to the frame element plane. Surfaces 86 are only visible on one side of each fitting 22 and 26 in FIG. 3b. Surfaces 86 are adapted to limit the relative angular position between the planes of frame elements fastened together, such that the angle between the planes of adjacent joined elements cannot be less than 90°. Thus, in FIG. 3a wherein elements 75, 77 and 79 form joint 21, the relative angular position between the plane of element 75 which carries the A-vertex fitting and the plane of element 77 which carries the C-vertex fitting is limited to a minimum of 90°. At the 90° relative angular position between elements 75 and 77, portions of the respective bevel surfaces 86 of the elements contact each other. The same limitation applies to the relative angular position between the respective planes of element 77 and element 79 which carries the B-vertex fitting.

Vertex fittings 22, 26 and 32 respectively include lock screw holes 38, 40 and 42. Lock screw holes 38 and 40 in fittings 22 and 26 respectively communicate between the surface and socket of the respective fitting. Lock screw hole 42 communicates between the surface of vertex fitting 32 and through hole 36. Each lock screw hole is adapted to receive a lock screw (not shown) which, when tightened, is effective to retain a fastening pin inserted into the respective fitting.

Referring again to FIG. 1, truss structure 50 is seen to comprise a prism-like structure, having four longitudinal edges 52, 54, 56 and 58 parallel to a central axis 60 and having a right cross section in the form of a square. Each longitudinal edge 52, 54, 56 and 58 respectively, consists substantially only of the C-sides of the respective frame elements. A plurality of diagonal struts 62 interconnect points along diagonally opposite longitudinal edges, each such point being located at the joint of a plurality of vertex fittings. In the embodiment shown in FIG. 1, each diagonal strut 62 is substantially linear and intersects axis 60 substantially perpendicularly thereto. While the use of diagonal struts provides necessary rigidity to the truss structure, it may be possible, by the proper choice of frame element dimensions, to dispense with them.

The details of a preferred diagonal strut are illustrated in FIG. 4. Referring to FIG. 4a, strut 62 is seen to include a pair of end connectors 64, affixed at opposite ends in alignment with a strut strut axis 65. FIG. 4b shows the details of end connector 64, which is seen to include a cylindrical head portion 66 having an end face 68 and a hole 70. The hole is coaxial with the strut and is adapted to hold a strut pin. In the preferred embodiment of the present invention, the strut pin takes the form of a threaded stud 72. Referring to FIGS. 4c and 4d, stud 72 is seen to consist of two portions, a threaded portion 74 and a smooth portion 76 having a larger diameter than the threaded portion and including two flat keyways 78 located diametrically opposite each other. The connector further includes a lock screw 80 and a key 82 positioned diametrically opposite each other and respectively adapted to fit into keyways 78. With lock screw 80 loosened, stud 72 is free to slide axially within hole 70, but is constrained from rotation about axis 65 by the key. The threading of studs 72 at opposite ends of strut 62 is in mutually opposite directions, each stud being adapted to engage a suitably threaded hole 84 in a C-vertex tab 34, as best shown in FIG. 3b.

The free vertex points 85 and 87 at the left-hand terminating end of structure 50, as viewed in FIG. 1, are seen to be joined together by an end strut 88. Vertex point 87 is further connected to point 89 of the structure by an end strut 90. The free vertex points 91 and 93 at the right-hand terminating end of the truss structure are joined together by an end strut 92. Point 91 is further connected to point 95 of the structure by an end strut 94. Each end strut 88 and 90 is preferably identical to the strut used for side $B_s$ of a frame element, hereafter referred to as a B-end strut, and carries vertex fittings 22 and 32 on its respective ends. Each end strut 92 and 94 is preferably identical to the strut used for side $A_s$ of a frame element, hereafter referred to as an A-end strut, and carries vertex fittings 26 and 32.

A truss structure constructed from the preferred elements always includes two B-end struts on one terminating end and two A-end struts on the opposite end. As shown in FIG. 1, each end of the truss shown there is "planar", the plane at the left hand end being defined by vertex points 83, 85, 87 and 89 and at the right hand end by vertex points 91, 93, 95 and 99. However, the ends of such a structure, once the end struts are in place, need not be "planar". Either or both terminating ends of such a structure may be "puckered", as shown in an alternative embodiment 96 illustrated in FIG. 5. The free vertex points 101 and 103 at the left-hand terminating end of structure 96 are respectively joined to the structure by B-end struts 98 and 100. The free vertex points 105 and 107 at the right-hand end of the structure are respectively joined to the structure by A-end struts 102 and 104.

The method of constructing the aforesaid truss structure in a gravity-free environment from substantially identical triangular frame elements lends itself to a number of variations. In one embodiment, the frame elements are initially arranged as a chain comprising at least two rows of frame elements. For a truss structure comprising elements defined by the above-described equation, $COS \alpha = NC/4B$, the value of N corresponds to the number of rows in the chain.

Figure 7:
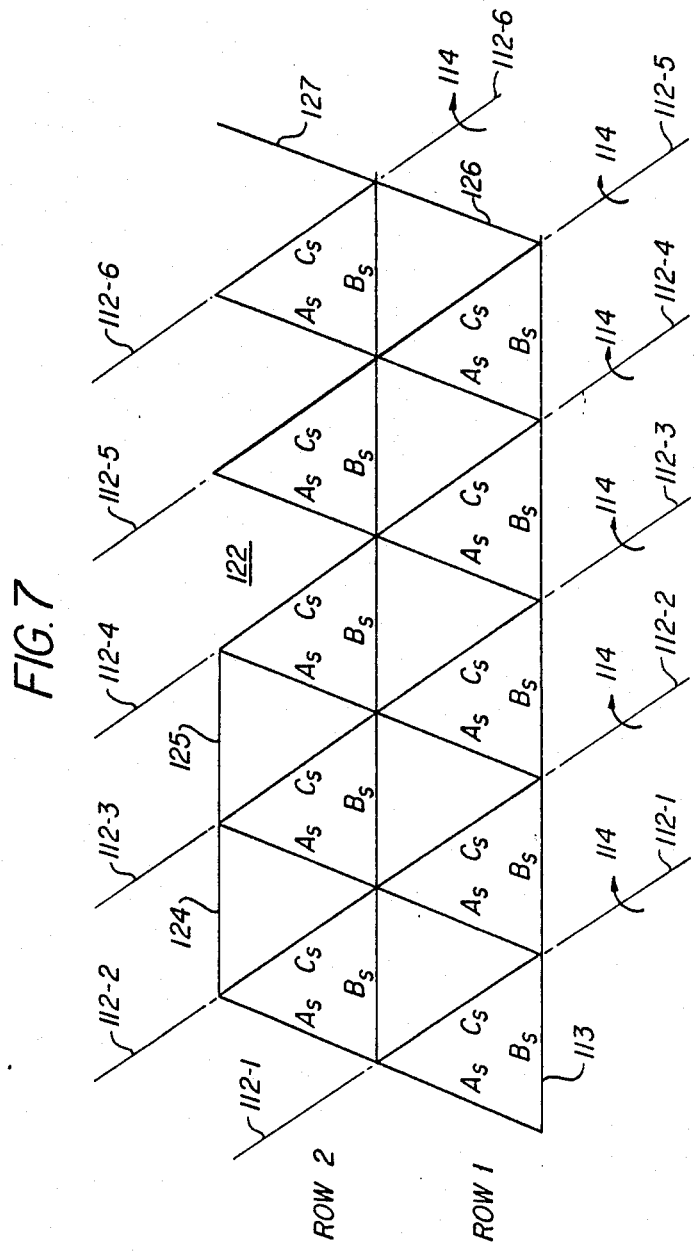
FIG. 7 illustrates a 2-row chain of frame elements and a method of constructing a truss structure therefrom in accordance with the present invention.

In one variation of this method, a 2 row chain comprising the preferred elements is used, i.e. where $N=2$ and $C=2B/\sqrt{3}$ in the above-described equation. Referring to FIG. 7, such a chain 122 comprises elements arranged in two rows of equal length, respectively designated row 1 and row 2. The sides of the respective elements are designated $A_s$, $B_s$ and $C_s$, as in FIGS. 1 and 2.

In each row of elements, the A-vertex of each element is hingedly joined to the C-vertex of the adjacent element. Except for certain elements at the ends of a chain, the B-vertex of each element forms a hinged joint with the proximate A- and C-vertices of elements in the adjacent row. This applies to each but the Nth row of the chain, i.e. row 2 of chain 122. At each location where at least two frame elements are joined, fastening pin 30 is present and is rigidly held in the A- or B-vertex fittings, or in both where both vertex fittings are present, by tightening the lock screws located therein. The lock screw in the through hole of the C-vertex fitting at each such location is left untightened. This arrangement permits freedom of rotation about the through hole axis in the element carrying the C-vertex, with respect to the other element or elements carrying fittings joined thereto.

Figure 6:
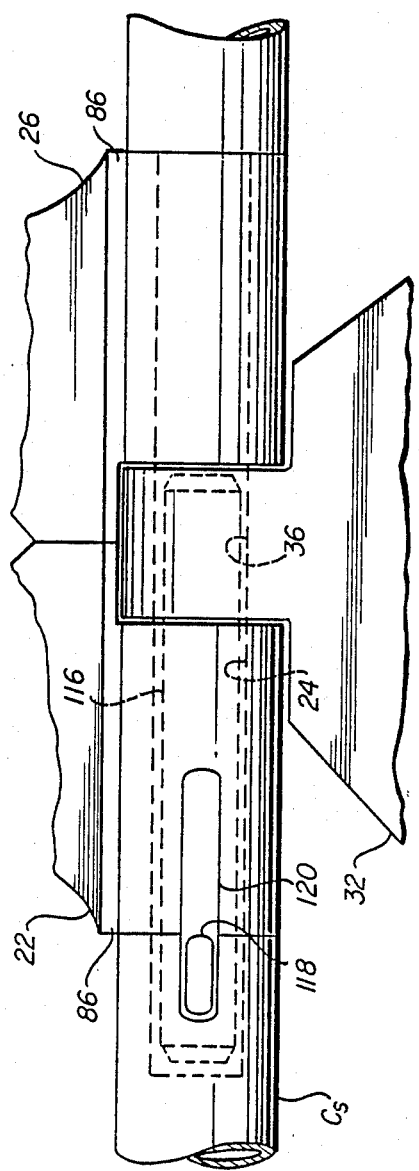
FIG. 6 illustrates an alternative form of an A-vertex fitting.

The configuration of the A-vertex fitting of selected elements in the chain formed as part of this construction method differs from that shown in FIG. 3. Referring to FIG. 6, the A-vertex fitting in these selected elements includes a retractable fastening pin 116 which has a slot 118, all within vertex fitting 22. Fitting 22 further includes a slot 120 which extends into element side $C_s$. By inserting a tool, such as the blade of a screwdriver, into slot 118 and moving it along the length of slot 120, pin 116 may be extended out of, or retracted into, fitting 22.

With respect to the chain of elements illustrated in FIG. 7, each A-vertex of a row 1 element is fitted with the above-described retractable fastening pin. Referring again to FIG. 6, in row 1 of the chain, pin 116 is extended into through hole 36 of C-vertex fitting 32 of the adjacent element, and the lock screw (not shown) in the A-vertex fitting is tightened.

Referring again to FIG. 7, the method proceeds with a first element 113 in row 1 of the chain and folding in succession along parallel folding lines 112-1, 112-2, 112-3, etc. Each such folding line comprises either a single C-side of a frame element, or two mutually aligned C-sides of different frame elements. Each fold is made by rotating the element or elements being folded in a predetermined rotational sense 114 through substantially 90°. The contact established between bevel surfaces 86 limits each rotation to 90°. At the completion of each 90° rotation, the lock screws in the C-vertex fittings which lie along fold line 112 are tightened against further rotation. Upon completing the third rotation and upon each rotation thereafter, the C-vertex fitting of the first element in row 1 and, subsequently, the hingedly joined A- and C-vertices of the row 1 elements are brought into confrontation with the free B-vertices of the row 2 elements.

The triad of elements carrying the vertex fittings at these confronting vertices are then joined to form hinged joints. Joining is achieved by loosening the lock screw in the A-vertex fitting of the appropriate element in row 1, aligning the row 2 B-vertex socket with pin 116, extending the pin into the socket of the row 2 element B-vertex fitting and tightening the lock screws in the A-, B- and C-vertex fittings being joined.

In one variation of the method of constructing a truss structure from a chain of elements, B-end struts 124 and 125 are installed following the third rotation. Their respective positions, as well as those of A-end struts 126 and 127, are shown for the chain in FIG. 7 for illustrative purposes. Thus, the end of strut 125, which carries an A-vertex fitting, is joined to the B-vertex fitting of the third element in row 2 and to the C-vertex of the first element in row 1, to form a hinged joint therewith. The end of strut 124, which carries an A-vertex fitting, is joined to the B-vertex fitting of the second element in row 2 and to the end of strut 125 which carries a C-vertex fitting, to form a hinged joint therewith. The end of strut 124 carrying a C-vertex fitting is hingedly joined to the B-vertex fitting of the first element in row 2.

A-end struts 126 and 127 are installed after folding of the chain has been completed. The end of strut 126 carrying a C-vertex fitting is hingedly joined to the A-vertex fitting of the last element in row 1. The end of strut 127 carrying a C-vertex fitting is joined to the A-vertex fitting of the last element in row 2 and to the end of strut 126 carrying a B-vertex fitting, to form a hinged joint therewith. The end of strut 127 carrying a B-vertex fitting is joined to the hingedly joined A- and C-vertex fittings belonging to the third from last element and the second from last element respectively in row 1, to form a hinged joint therewith.

After completing the above-described steps, the diagonal struts may be installed in the truss structure. Referring again to FIG. 4, each diagonal strut may be installed by positioning it between the confronting C-vertex fittings on diagonally opposite longitudinal edges of the structure. The threaded portion 74 of each stud 72 at each strut end engages hole 84 in the proximate C-vertex tab. With lock screw 80 loosened, the stud may be slid into hole 70 so that the threaded portion extends beyond end face 68 by a small distance. The length of strut 62 is selected to enable the extended portions of the studs at opposite strut ends to engage holes 84. Thereafter, the strut is tightened in position by rotating it about axis 65. This rotation and the fact that the studs are threaded in mutually opposite directions, causes each stud 72 at opposite ends of strut 62 to be drawn out of its hole 70. Each stud is free to move axially while lock screw 80 remains loosened. Tightening of the stud is complete when end face 68 at each end of the strut contacts the proximate C-vertex tab. Lock screw 80 at each strut end is now tightened to prevent further axial movement of the stud.

Figure 8:
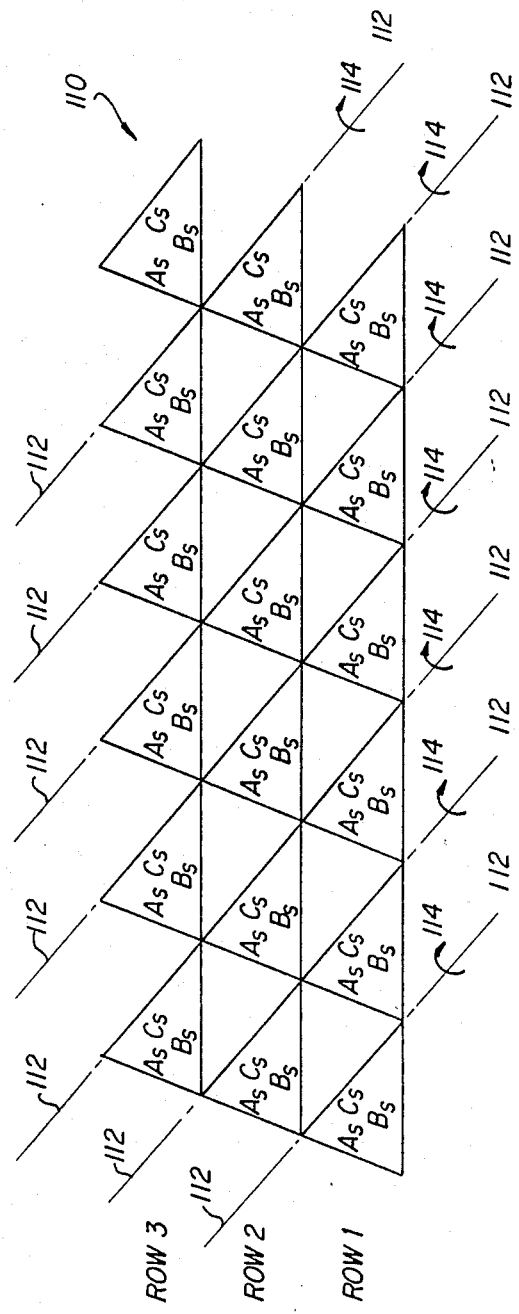
FIG. 8 illustrates a 3-row chain of frame elements and a method of constructing a truss structure therefrom.

FIG. 8 schematically illustrates a 3-row chain 110 of elements, each element being defined by the aforesaid equation, wherein $N=3$ and $B=C$. The respective rows of the chain are designated row 1, row 2 and row 3. The sides of the respective elements are designated $A_s$, $B_s$ and $C_s$, as in FIGS. 1 and 2. To construct a truss structure from a chain comprising three or more rows, the steps of folding, locking and joining proceed essentially as described with respect to the 2-row chain shown in FIG. 7. The 3-row chain in FIG. 8 shows folding lines 112 and further indicates the rotational sense 114 for illustrative purposes. As discussed above, however, the configuration of the end struts will differ for structures where $N>2$.

Figure 9:
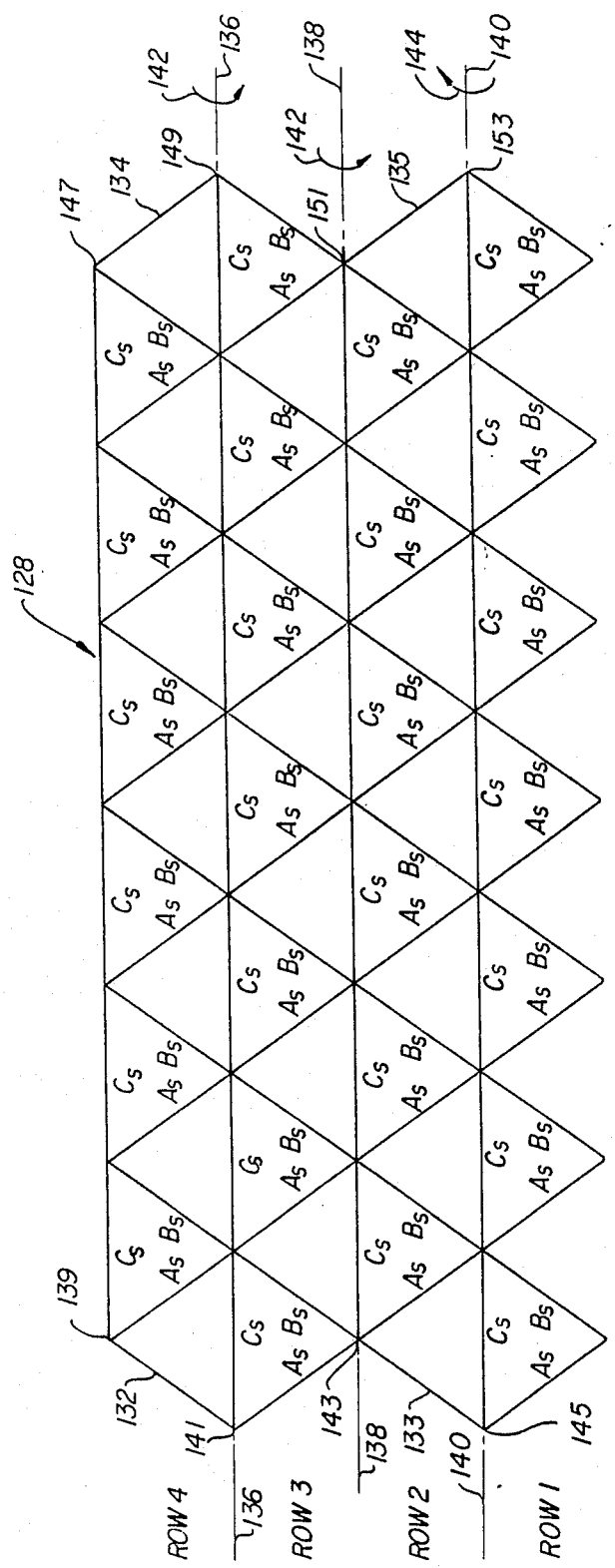
FIG. 9 illustrates a method of constructing a truss structure from a 4-row network of frame elements.

The present invention is not limited to the chain method of construction described in connection with FIGS. 7 and 8. In accordance with a further embodiment of the construction method, the structure herein may be built in a gravity-free environment from frame elements which are initially arranged as a network consisting of four rows. In one embodiment of this method, the network comprises the preferred elements for which $N=2$ and and $C=2B/\sqrt{3}$ in the above-described equation. Referring to FIG. 9, a network 128 includes four rows of elements, designated rows 1 to 4. In each row, the A-vertex of each element is hingedly joined to the B-vertex of the adjacent element. With the exception of the elements in row 1, the C-vertex of each element in the network forms a hinged joint with the proximate A- and B-vertices of elements in the adjacent row. In one form of the embodiment under discussion, two B-end struts 132 and 133 and two A-end struts 134 and 135 are added to the initial network of frame elements, as shown in the drawing.

The end of B-end strut 132, which carries an A-vertex fitting, is joined to the B-vertex of the first element in row 4, as indicated at 139. The end of strut 132 carrying a C-vertex fitting is joined to the B-vertex of the first element in row 3 at point 141. The end of B-end strut 133, which carries an A-vertex fitting, forms a hinged joint with the C-vertex of the first element in row 3 and the B-vertex of the first element in row 2 at point 143. The end of strut 133, which carries a C-vertex fitting, is joined to the B-vertex of the first element in row 1 at point 145.

The end of A-end strut 134, which carries a B-vertex fitting, is joined to the A-vertex of the last element in row 4 at point 147. Each A-vertex of an element in row 4 is preferably fitted with a retractable fastening pin previously described and illustrated in FIG. 6. The pin extends into the B-vertex of the adjacent element or end strut. The end of strut 134 carrying a C-vertex fitting is joined to the A-vertex of the last element in row 3 at point 149. The end of A-end strut 135, which carries a B-vertex fitting, forms a hinged joint with the C-vertex of the last element in row 3 and the A-vertex of the last element in row 2 at point 151. The end of strut 135, which carries a C-vertex fitting, is joined to the A-vertex fitting of the last element in row 1 at point 153.

At each location where frame elements are joined, fastening pin 30 is rigidly held in the A- and B-vertex fittings upon tightening the lock screws in those fittings. However, the lock screw in the through hole of the C-vertex fitting at each such location is left untightened. This results in freedom of rotation about the through hole axis for the element which carries the C-vertex fitting. Such rotation may occur relative to the other two elements which carry, respectively the A- and B-vertex fittings joined to the C-vertex fitting. As a consequence of this freedom of rotation, the aligned C-sides of the elements of rows 3, 2 and 1 respectively, constitute three folding lines 136, 138 and 140.

The construction of a truss from the network shown in FIG. 9 commences by rotating the elements of row 4 in unison about folding line 136 in a predetermined rotational sense 142 through substantially 90°. The rotation proceeds until contact is established between bevel surfaces 86 of the elements of row 3 at an angle of rotation of about 90°. At the completion of the rotation the lock screws in the C-vertex fittings of the elements and end struts in row 4 are tightened against further rotation. Next, with row 4 locked at a 90° angle relative to row 3, the elements of row 3 are rotated in unison about folding line 138 in the rotational sense shown by arrow 142. This rotation is again limited to 90°, by virtue of contact between the bevel surfaces 86 of the elements of rows 3 and 2. Upon completion of the last-described 90° rotation, the lock screws in the C-vertex fittings of the elements in row 3 are tightened against further rotation. Finally, the elements in row 1 are individually rotated through substantially 90° about folding line 140, in a rotational sense 144 opposite to the direction 142. This results in each pair of hingedly joined A- and B-vertex fittings in row 4 being brought into confrontation with a C-vertex fitting of a row 1 element. The confronting elements of each triad of elements are then joined by loosening the lock screws in the A- and B-vertex fittings of each element of row 4, retracting each pin 116 into its A-vertex fitting, aligning the through hole axis of each C-vertex fitting of row 1 with the axis of the pin, extending the pin first through the C- and then into the B-vertex fitting of the elements being joined and tightening the lock screws in all three vertex fittings. Upon completion of the above-described steps, diagonal struts 62 are installed in the manner previously discussed to complete the truss structure.

Figure 10:
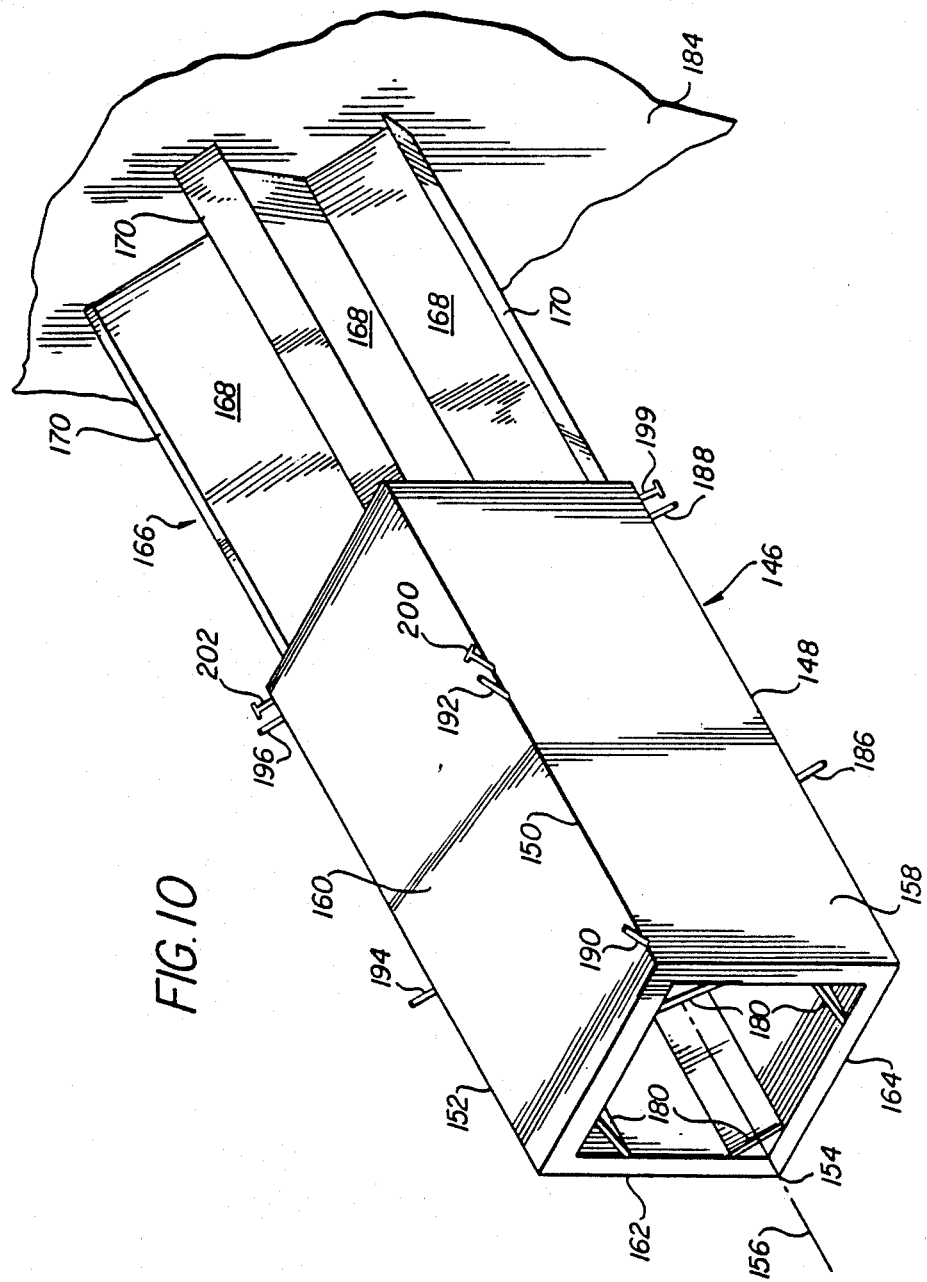
FIG. 10 illustrates a preferred construction fixture in accordance with the present invention.

A preferred method of constructing a truss structure in accordance with the present invention uses automated apparatus to position the respective frame elements in a gravity-free environment and to fasten them in place. FIG. 10 shows a construction fixture 146 which has an elongate prism shape and a square cross section. Four longitudinal edges 148, 150, 152 and 154 are parallel to a longitudinal axis 156. The planes defined between the longitudinal fixture edge constitute solid faces in the preferred embodiment of the invention, as shown at 158, 160, 162 and 164. However, where the longitudinal edges are adapted to provide adequate support for frame elements deposited upon fixture 146 during construction of the truss structure, the solid fixture faces can be be dispensed with.

Figure 11:
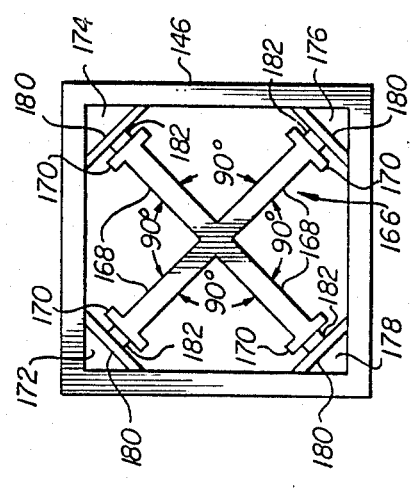
FIG. 11 is a cross-sectional view of the construction fixture of FIG. 10.

Fixture 146 is coaxially mounted on a rigid beam 166 and is axially movable therealong. As best shown in FIG. 11, beam 166 includes four radial web members 168, each terminating in a widened track portion 170. Web members 168 are angled at 90° relative to each other such that track portions 170 extend to the four corner regions 172, 174, 176 and 178 of fixture 146. The intersection of members 168 is centered on axis 156 of fixture 146. A plate 180 bridges each corner region and extends substantially the entire length of fixture 146. In the preferred embodiment, each plate 180 may be fitted with a rack engaged by a pinion gear 182 mounted on each track portion 170 of beam 166. At least one pinion gear may be powered in order to drive fixture 146 on command relative to beam 166.

During construction, one end of beam 166 is affixed to a location on a reference surface 184, such as the surface of a vehicle in gravity-free space. A pair of retractable fixture pins is disposed along each of the four longitudinal fixture edges 148, 150, 152 and 154. Pin pairs 186, 188; 190, 192; and 194, 196 are visible in FIG. 10. When extended, each pair of fixture pins acts to hold two vertices of a frame element, the third vertex being supported by being joined to the mating vertex of an adjacent frame element. As a result, the frame element is securely held on fixture 146 during construction. Each fixture pin preferably has an axis which lies along the bisector of the angle formed by the fixture planes which intersect in the edge where the pin is located. For example, each of pins 186 and 188 is capable of selectively retracting along its axis which forms a 45° angle with each of fixture planes 158 and 164. The mechanisms (not shown) for extending and retracting the respective fixture pins are positioned in corner regions 172, 174, 176 and 178.

FIG. 12 shows fixture 146 with two frame elements, designated I and III respectively, positioned on fixture planes 158 and 160. Element I has sides designated 1A, 1B and 1C and vertices designated $A_{v1}$, $B_{v1}$ and $C_{v1}$. Element III has sides designated 3A, 3B and 3C and vertices designated $A_{v3}$, $B_{v3}$ and $C_{v3}$. Each fixture pin, when extended, engages a mating fixture pin hole 198, shown in FIG. 3, located at the vertex of a suitably positioned frame element. For example, in the arrangement in FIG. 12 fixture pin 190 extends from edge 150 of fixture 146 to engage the mating fixture pin hole in vertex $B_{v1}$ of frame element I. Fixture pin 192 likewise extends from fixture edge 150 to engage a mating fixture pin hole in vertex $A_{v1}$ of element I, the latter thus being held in position on fixture 146 by fixture pins 190 and 192. Similarly, fixture pins 194 and 196 extend from fixture edge 152 to respectively engage mating fixture pin holes in vertices $B_{v3}$ and $A_{v3}$ of element III, which is thereby held on fixture 146.

A retractable torquing device extends from each longitudinal fixture edge. Torquing devices 199, 200 and 202 are visible in FIGS. 10 and 12, extending from fixture edges 148, 150 and 152 respectively. Each torquing device is adapted, when extended as shown, to engage the aligned lock screw at an A-vertex fitting, specifically the lock screw located in hole 38 of vertex fitting 22 in FIG. 3. This alignment occurs when a frame element is held in position on fixture 146 by the appropriate fixture pins. Each torquing device is capable of tightening or loosening the lock screw aligned therewith while constructing or disassembling, respectively, the truss structure. The mechanisms (not shown) for actuating the respective torquing devices are positioned in corner regions 172, 174, 176 and 178.

Figure 13:
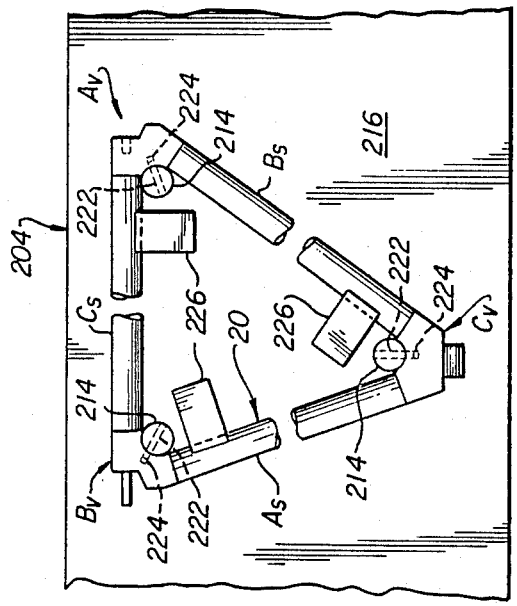
FIG. 13 is a plan view of a frame feed unit in accordance with the present invention.
Figure 14:
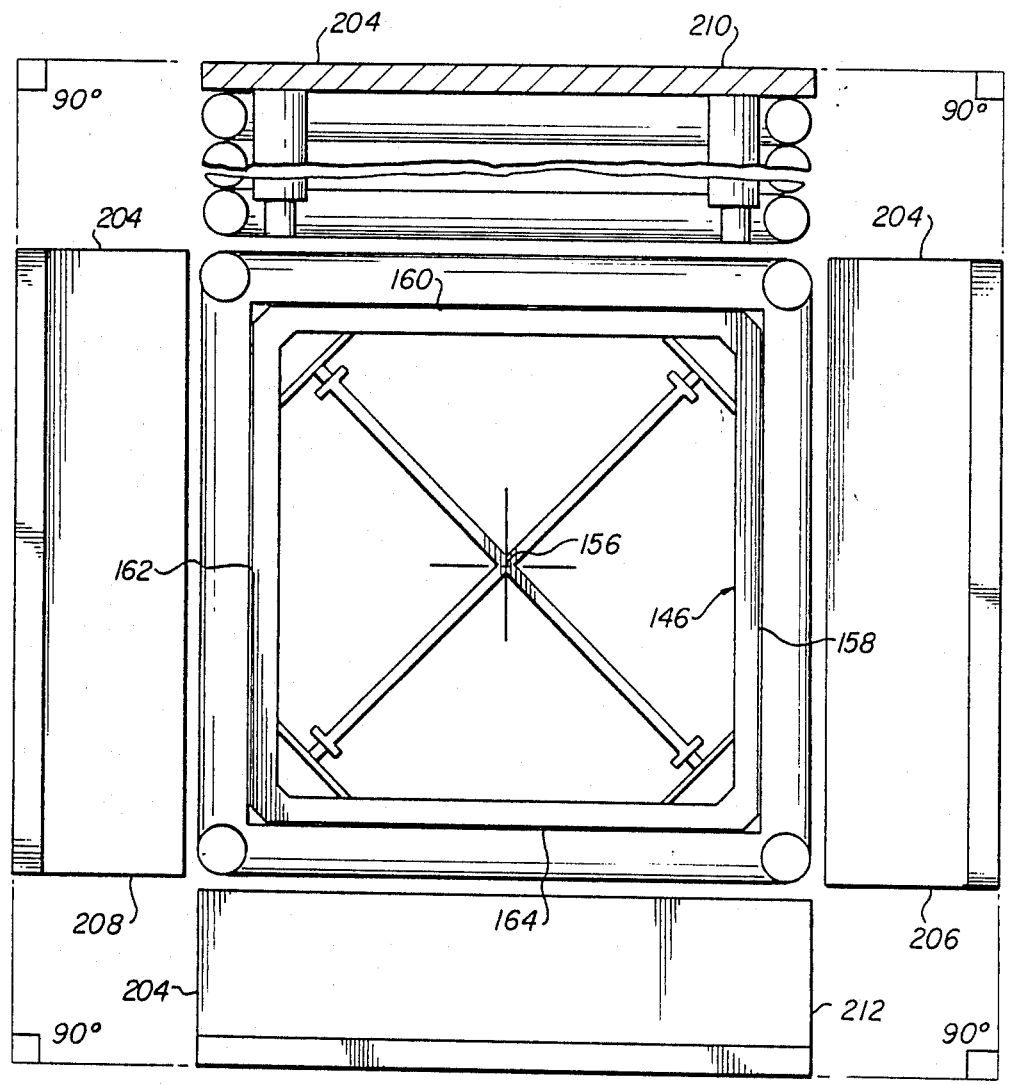
FIG. 14 is a simplified sectional view showing the relationship of the construction fixture to the frame feed units.

FIG. 13 is a plan view of a frame feed unit 204 with frame elements 20 stacked thereon. As shown in FIG. 14, first, second, third and fourth frame feed units, designated 206, 208, 210, and 212 respectively, are spaced 90° from one another around longitudinal axis 156 of fixture 146. Feed units 206 and 208 are positioned diametrically across from each other, as are feed units 210 and 212. Further, feed units 206 and 208 are equidistantly spaced from reference surface 184 and axially spaced from feed units 210 and 212. The latter feed units are likewise equidistantly spaced from the reference surface and are axially positioned closer to the reference surface than feed units 206 and 208 by a distance substantially equal to one-half the length of an element side $C_s$.

Figure 15:
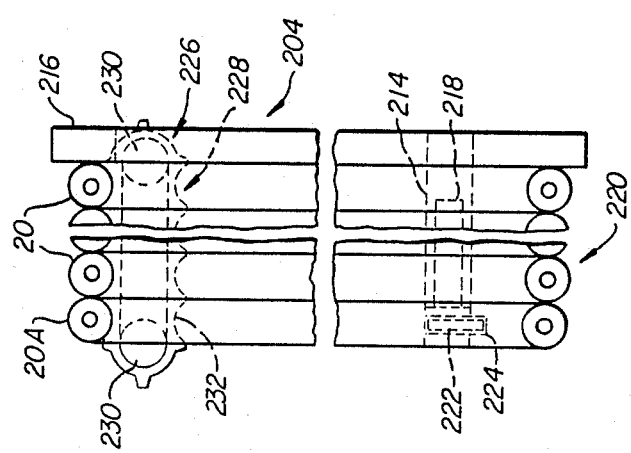
FIG. 15 is a side view of a frame feed unit.

Referring again to FIG. 13 and also to FIG. 15, feed unit 204 comprises three substantially identical telescoping guide post 214 perpendicularly mounted to a base plate 216. The guide posts are located on the base plate in a pattern which conforms to the triangular configuration of elements 20. Each guide post 214 contains a telescoping shaft 218 and includes means, not shown, for driving shaft 218 to a desired position. Thus, in effect the free end of each guide post (actually the free end of shaft 218) can be extended outward. Guide posts 214 have a length chosen to support a predetermined number of frame elements in a stack 220. The size of the stack carried by the guide posts of the respective frame feed units 204 determines the number of frame elements that can be added to the truss structure to be constructed before each feed unit must be replenished with additional frame elements. The free end of each shaft 218 is fitted with a selectively retractable end pin 222. Upon extension, each end pin 222 is adapted to engage a mating vertex hole 224 located on the inside of the vertex fittings at each vertex $A_v$, $B_v$ and $C_v$.

Each feed unit 204 further includes three substantially identical belt units 226, each positioned within stack 220 and mounted on base plate 216 adjacent one guide post 214. As best shown in FIG. 15, each belt unit 226 includes a belt 228 mounted on a pair of pulleys 230, such that belt 228 is perpendicular to the base plate. In one form of feed unit, belt units 226 are free-wheeling and no forced driving means are provided. Each belt includes contours 232 which mate with frame elements 20 in stack 220.

Figure 16:
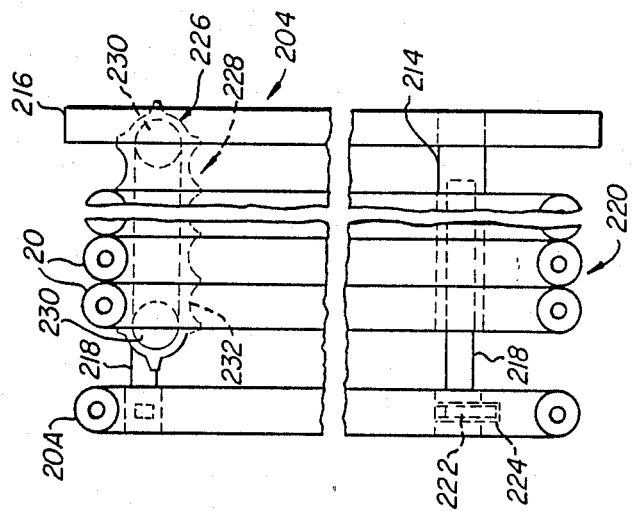
FIG. 16 is a side view of a frame feed unit during the feeding operation.

Referring now to FIG. 16, the selected frame element 20A on top of stack 220 is held by pins 222. To move frame element 20A away from base plate 216, shafts 218 extend out of guide posts 214 and all three belts 228 rotate by the span of one contour 232. Belt rotation, produced by contact between moving frame element 20A and the proximate contour 232 of each belt 228, causes the remaining elements in the stack, by their contact with the belt contours, to move in unison up toward the free ends of guide posts 214. Conversely, when an element is added to the top of the stack during disassembly of the truss structure, the belts will rotate in the opposite direction and cause the frame elements in the stack to move down on the guide posts toward base plate 216. It will be understood by those skilled in the art, that the terms "up" and "down" are used in a relative sense herein for purposes of explanation and not in their absolute sense.

As seen in FIG. 14, each feed unit 204 is disposed in fixed relationship to reference surface 184 opposite one plane or face of fixture 146. The stacked elements are preferably positioned parallel to the confronting fixture plane.

In the automated construction method, the frame elements defined by the above-described equation, COS $\alpha = NC/4B$, preferably have dimensions as determined by $N=2$ and $C=2B/\sqrt{3}$. Additionally, fixture pin 30 is initially fixed in B-vertex fitting 26 of each element, as illustrated in FIG. 3. Using the aforesaid frame elements, the truss structure herein may be started with a variety of different end configurations. For example, referring to FIG. 5, a puckered end 97, using B-end struts 98 and 100, may initiate the truss structure.

Figure 17:
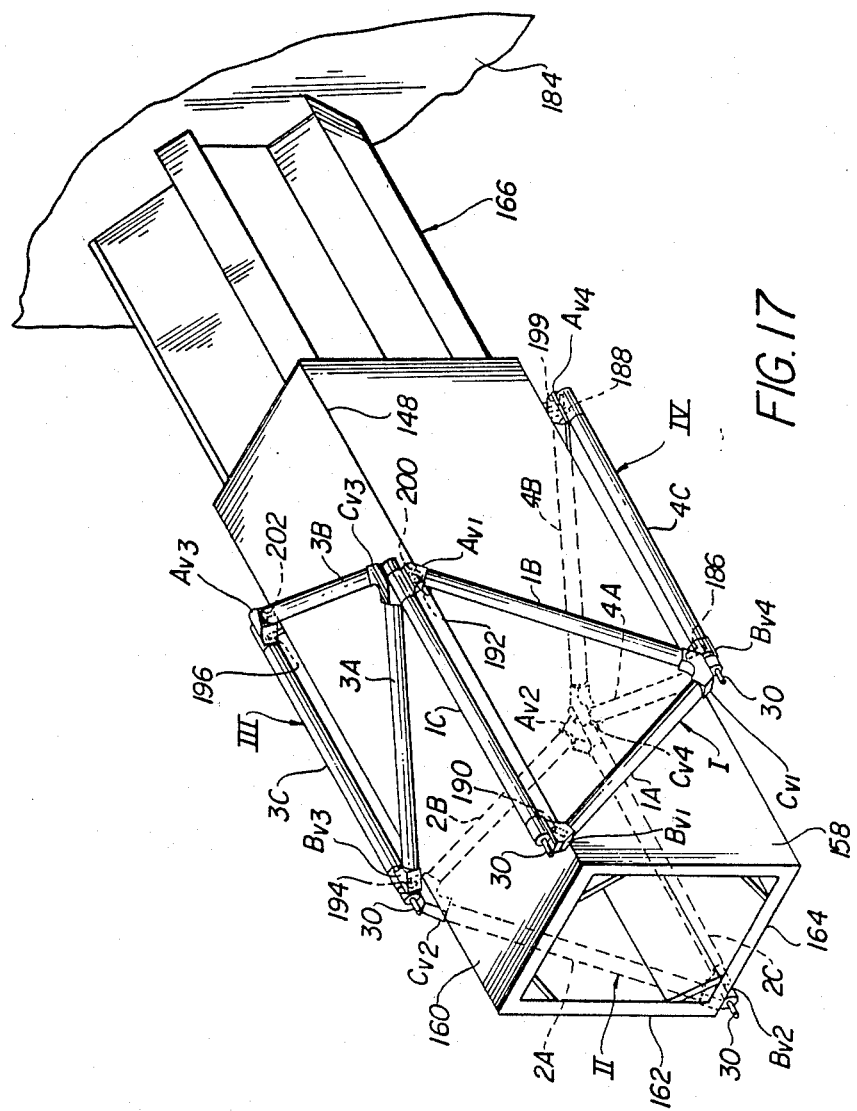
FIG. 17 illustrates the construction fixture during the automated construction operation.

By way of example, the assembly of a truss structure having the aforesaid puckered end configuration will be explained, using the above-described automated construction apparatus. Four frame elements are initially fed in sequence from feed units 206, 208, 210 and 212 to the fixture faces confronting each feed unit. As shown in FIG. 17, these elements are designated I, II, III and IV. Each feed unit feeds elements to its respective confronting fixture face in identical manner.

Figure 18A:
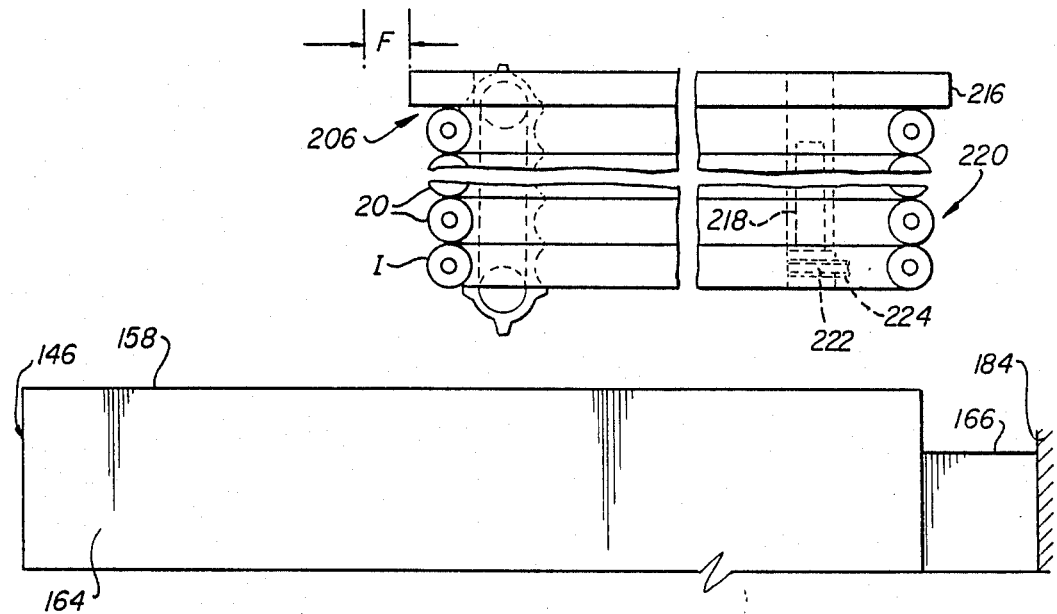
FIGS. 18a, 18b and 18c are side views of a frame feed unit during the feeding operation.

FIG. 18 illustrates in side view the operation of feed unit 206 in the process of feeding element I to fixture face 158. Referring to FIG. 18a, base plate 216 of feed unit 206 moves from an initial position through a distance F in a backward axial direction toward reference surface 184. Distance F is greater than the length of the portion of fixture pin 30 which extends from fitting 26. Shafts 218 on the feed unit, having elements 20 stacked thereon, are positioned to align end pins 222 with the vertices of element I on top of the stack. To "select" frame element I, end pins 222 are extended to engage mating holes 224 as well as the vertex fittings of element I. The simultaneous engagement of holes 224 by end pins 222 at vertices $A_{v1}$, $B_{v1}$ and $C_{v1}$ of element I on stack 220 is effective to "select" element I, i.e. to hold it.

Figure 18B:
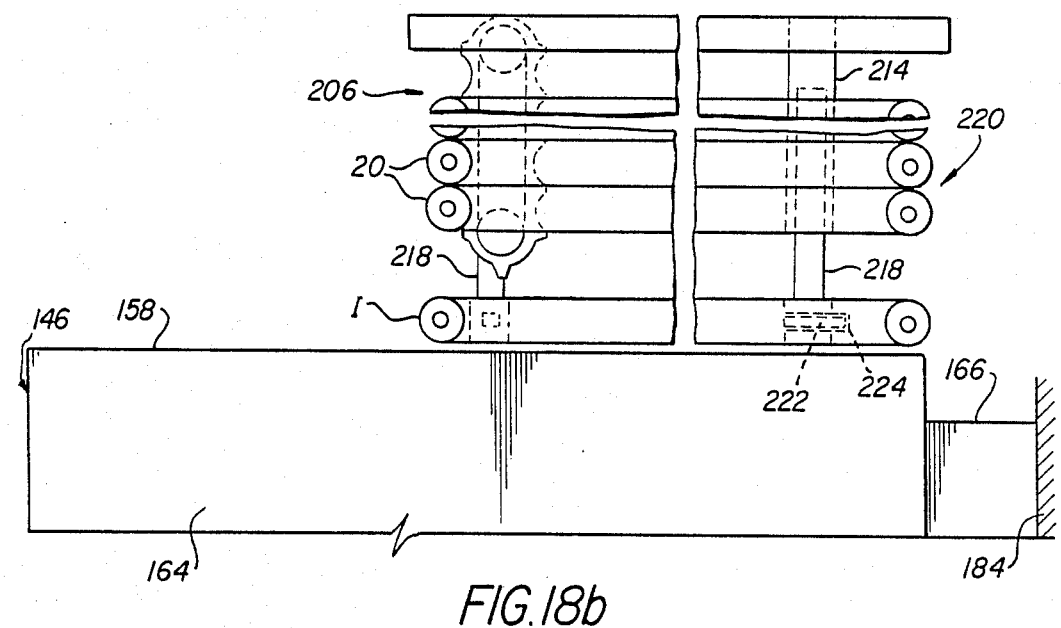
Figure 18C:
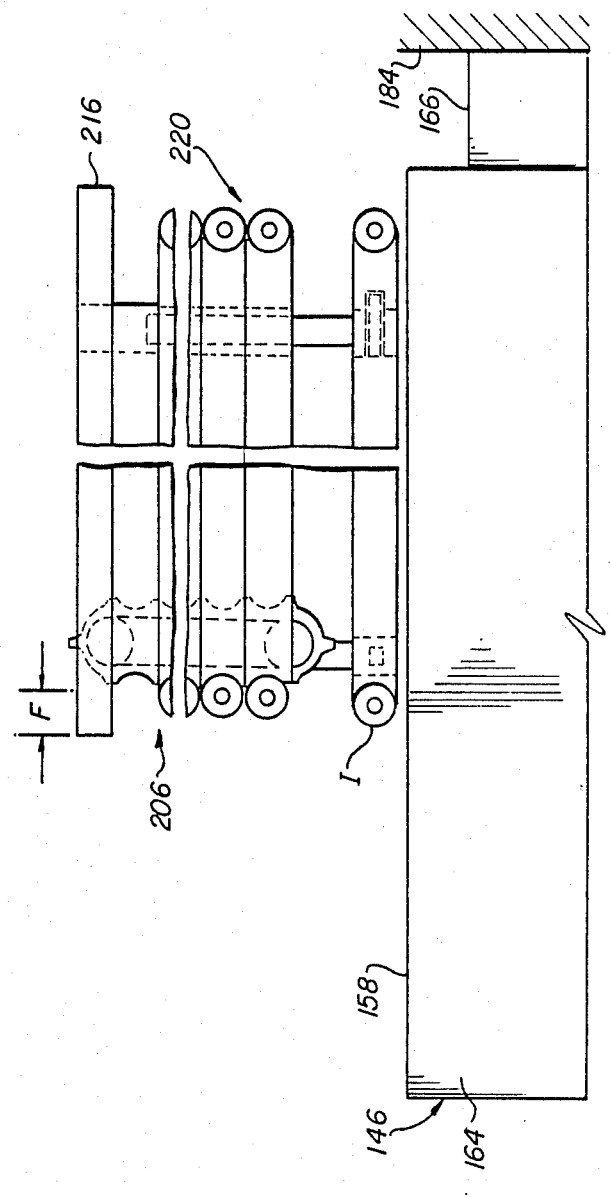

Next, referring to FIG. 18b, shafts 218 are extended out of guide posts 214 to thereby move element I in a direction away from base plate 216 and toward the confronting fixture face. Element I is thus placed in construction position in confronting fixture face 158 with side 1C aligned with fixture edge 148 (FIG. 17). Thereafter, as shown in FIG. 18c, base plate 216 of feed unit 206 moves from its current position through distance F in a forward axial direction, i.e. away from reference surface 184. The resulting position of element I is as shown in FIG. 17. Following the feeding of element I to the fixture, fixture pins 190 and 192 are extended to engage and hold element I on the fixture. Shafts 218 of feed unit 206 remain extended engaging the element.

In the manner just described, second feed unit 208 feeds a frame element II to fixture face 162. Element II has sides designated 2A, 2B and 2C and vertices designated $A_{v2}$, $B_{v2}$, and $C_{v2}$. Fixture pins (not shown) are extended to engage and hold element II on the fixture. Shafts 218 of feed unit 208 remain extended to engage element II.

Thereafter, the third feed unit 210 feeds element III, having side and vertex designations as previously described, to fixture face 160. The forward axial movement of feed unit 210 is effective to insert the fastening pin fixed in vertex $B_{v3}$ of element III into the through hole in vertex $C_{v2}$ of element II. Fixture pins 194 and 196 are extended to engage and hold element III on the fixture. Shafts 218 of feed unit 210 remain extended to engage the element.

Next, fourth feed unit 212 feeds a frame element IV to fixture face 164. Element IV has sides designated 4A, 4B and 4C and vertices $A_{v4}$, $B_{v4}$ and $C_{v4}$. The forward axial movement of feed unit 212 is effective to insert the fastening pin in vertex $B_{v4}$ of element IV and into the through hole in vertex $C_{v1}$ of element I. Fixture pins 186 and 188 are extended to engage and hold element IV on the fixture. Shafts 218 of feed unit 212 remain extended to engage element IV.

B-end struts 98 and 100 are manually installed next. As shown in FIG. 5, end strut 98 extends between the free vertex consisting of vertex $B_{v1}$ of element I and the joined $C_{v2}$ and $B_{v3}$ vertices of elements II and III respectively. Fastening pin 30, which is fixed in vertex $B_{v3}$ and already extends through the through hole in vertex $C_{v2}$ of element II, now additionally engages socket 24 of the A-vertex fitting attached to one end of strut 98. With respect to the other end of strut 98, fastening pin 30, which is fixed in vertex $B_{v1}$ of element I, is inserted through the through hole of the C-vertex fitting attached to the other end of the strut. The lock screws in the fittings at the respective ends of strut 98 are then tightened.

End strut 100 extends between the free vertex consisting of vertex $B_{v2}$ of element II and the joined vertices $C_{v1}$ and $B_{v4}$ of elements I and IV respectively. Fastening pin 30, which is fixed in vertex $B_{v4}$ and which is already inserted through the through hole in vertex $C_{v1}$, now engages socket 24 of the A-vertex fitting attached to one end of strut 100. With respect to the other end of strut 100, fastening pin 30, fixed in vertex $B_{v2}$, is inserted through the through hole of the C-vertex fitting attached to the other end of the strut.

Following the installation of the fourth element, the fixture, which now holds elements I, II, III and IV thereon, is axially moved in a forward direction, i.e. away from surface 184, to enable the feeding of additional elements from the feed units. Prior to the aforesaid axial fixture movement, shafts 218 of feed units 206, 208, 210 and 212 are disengaged from elements I, II, III and IV respectively, by retracting end pins 222 from the respective elements and then withdrawing the shafts from those elements. Fixture 146 is then moved in the forward axial direction through a distance T, where T is substantially equal to $C_s$, i.e. to the length of a C-side.

Next, each feed unit 206, 208, 210 and 212, in sequence, feeds one element to its respective confronting fixture face, thus bringing to eight the total number of elements fed to the fixture. The forward axial movement of each feed unit is effective to join a triad of elements. This is accomplished by first inserting the fastening pin fixed in the B-vertex of the element being fed into the C-vertex through hole of a previously fed element positioned on the adjacent fixture face nearest the C-side of the element currently being fed, and then into the A-vertex socket of the element previously fed by the current feed unit. Following the forward axial movement of each feed unit, the torquing device aligned with the lock screw in the A-vertex fitting of the element previously fed by the current feed unit is extended to engage and tighten the aligned lock screw. Shafts 218 of each feed unit remain extended to engage the last fed element. Thus, a total of eight elements are joined to each other.

Following the installation of the element resulting from the second feeding operation by the fourth feed unit (herein the eighth element installed), and following the installation of each fourth element thereafter, the completed portion of the truss structure is shifted in a forward axial direction along fixture 146 in order to expose a further portion of the fixture and to permit the addition of further elements to the truss. The respective axial positions of the fixture and of the portion of the structure built up to that point in time are shown diagrammatically in FIG. 19 for this operation. FIG. 19 provides a side view of fixture face 158 and shows only the frame elements I and V. While the shifting operation is described below primarily with reference to fixture face 158 and the aforesaid elements I and V, it will be understood that, at the indicated stage of construction of the truss structure, a pair of elements is mounted on each of the other three fixture faces and that operations similar to those performed with respect to elements I and V are simultaneously performed with respect to the elements not shown.

Figure 19A:
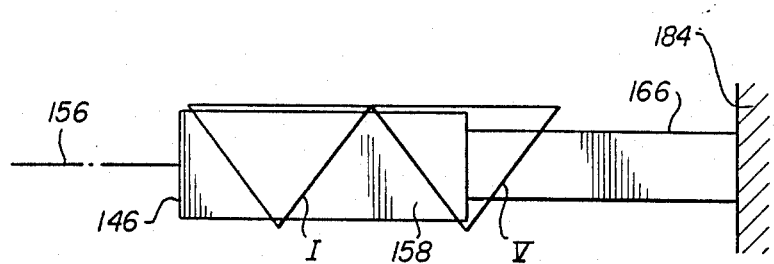
FIGS. 19a, 19b and 19c illustrate truss shifting during the automated construction of the truss structure.

Following the installation of the second element fed from fourth feed unit 212, the two elements designated I and V are positioned on face 158 opposite first feed unit 206, as shown in FIG. 19a. Element I is held on face 158 by fixture pins 190 and 192 (FIG. 18). Element V is held on end pins 222 of the guide post shafts of feed unit 206. Additionally, element V is held in place by virtue of being joined to adjacent elements at its respective vertices.

Figure 19B:
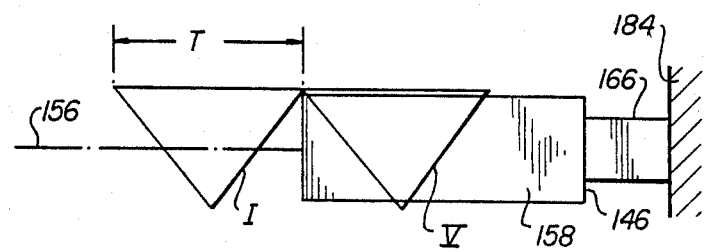

Fixture pins 190 and 192 are retracted to release the hold of fixture 146 on element I. While the structure is held on the end pins of the guide post shafts of the four feed units, fixture 146 is moved axially backward along axis 156 toward reference surface 184 by the previously defined distance T. The new fixture position is shown in FIG. 19b. Fixture pins 190 and 192 are now extended to engage element V. The end pins on the guide post shafts of the first feed unit are retracted from element V and the shafts are withdrawn from the element. As a result, the structure, comprising elements I and V plus six elements not shown, is held solely by fixture 146.

Figure 19C:
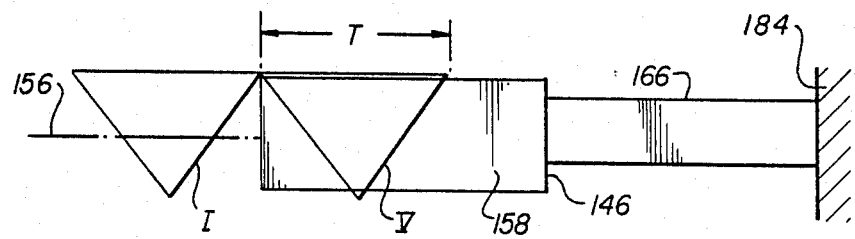

Next, as shown in FIG. 19c, fixture 146 is moved axially forward through distance T, carrying with it the truss structure. Upon completing this movement, the fixture is in position to receive for assembly an additional element on fixture face 158 and three additional elements on the three invisible fixture faces. The automatic procedure described above is now repeated to construct a further section of the truss structure by the addition of four more frame elements.

The foregoing steps are repeated until the stacks of elements have been exhausted and no further replenishment of the stacks is required, such that a truss structure of the desired length has been constructed. Diagonal struts 62 are installed next in the manner previously described. Further, two A-end struts are manually connected to the free vertex points on the right hand end of the truss structure, as seen in FIG. 5, where construction is complete.

As previously discussed, a number of different end configurations of the structure are possible and the connections of the end struts to the free vertex points and the structure will depend on the specific end configuration selected.

In general, by withholding delivery of an element from feed units 206 or 208 in the initial sequence of elements, a structure with a planar end will result, rather than the puckered end shown in FIG. 5. Additionally, by withholding delivery of three elements by feed units 206, 208 and 212, or by withholding three elements from feed units 206, 208 and 210 in the initial sequence of elements, a planar structure end will also result. For example, if prior to the initial forward axial movement of fixture 146 through distance T one element is fed from feed unit 210 and if no elements are fed from feed units 206, 208 and 212, the resultant left-hand end configuration of the structure will be planar with the orientation shown in FIG. 1. The planar end is always parallelogram shaped and forms an oblique angle with the axis of the structure.

In similar manner, the configuration of the right hand end of the truss structure may be varied. Thus, if the last four elements of the structure are delivered by feed units in sequence 206, 208, 210 and 212 (FIG. 14), the right-hand end of the structure will be puckered and will appear as in FIG. 5. In such a case, two A-end struts 102 and 104 will be installed with each end strut interconnecting a free vertex to a junction of a pair of element vertices on structure 96. As a further example, if the last four elements of the structure are delivered by feed units in the sequence 208, 210, 212 and 206, the right-hand end of the structure will be planar and will appear as in FIG. 1. As seen in FIG. 1, one A-end strut 92 is installed to interconnect the free vertices, while an additional A-end strut 94 is installed to interconnect one free vertex with the structure.

Since the left and right hand end configurations may be varied independently of each other, a completed truss structure may possess any desired combination of planar or puckered end configurations. For example, both ends may be planar and oriented to be parallel to each other.

In order to disassemble the truss structure using the above-described automated apparatus, in one variation, all the diagonal struts must first be manually removed. Then, the order of the steps of the construction method described above is substantially reversed and each torquing device is operated to loosen rather than to tighten the lock screw in each A-vertex. The guide posts extend and retract in order to carry individual frame elements from the truss structure back to the feed units where the frame elements are accumulated in four stacks. With respect to the diagonal struts, in another variation, instead of removing all of them prior to the structure disassembly, each strut may be manually removed as its position approaches the construction fixture during the disassembly. In the latter case, the structural integrity of the truss structure is maintained during disassembly, which is especially desirable if the truss structure is long or includes a payload mounted on its free end.

As disclosed herein, the automated construction method illustrated and described utilizes feed units with frame elements stacked thereon. However, the stacks and the associated belt units may be dispensed with, if desired. For example, each feed unit may be fitted with relatively short guide posts and be positioned relative to the construction fixture substantially as in the preferred embodiment of the invention. The frame elements may be supplied individually to each feed unit, by transporting them in a direction parallel to the axis of fixture 146. Thus, each frame element may be introduced into the space between the feed unit and the confronting fixture face. Each frame element in such a method is oriented so as to be substantially parallel to the fixture face which confronts the particular feed unit. The guide post shafts can then be extended to engage the newly introduced frame element to position it on the confronting fixture face. The balance of the procedure then follows the method described above with respect to the automated construction. One technique for individually supplying the frame elements from a remote point, rather than from a stack, may use a pallet or the like which moves on tracks. The tracks may be mounted on an extended portion of fixture 146 adjacent reference surface 184.

A major advantage of individually supplying the frame elements is to decouple the size of the completed truss structure from the stack capacity of the feed units. A further advantage is to reduce the volume of space required for the construction apparatus, since stacks are no longer required.

While in the automated method disclosed herein the B-end struts are manually installed, the invention is not so limited. Initially, each B-end strut may be positioned on top of the element stack on the feed unit confronting the prospective installed location of the strut. Each of the B-end struts so positioned are held in place on the stack by the strut's engagement with end pins 222 of feed unit guide posts 214. Then, in order to install the strut, shafts 218 are extended out of guide posts 214 to deliver the end strut to the confronting fixture face.

The automated construction method illustrated and disclosed herein includes the installation of end struts on the end of the truss structure when construction is completed. However, under certain operating conditions in gravity-free space, the truss structure may remain mounted on fixture 146 following the completion of assembly, being held thereon by the fixture pins. In the latter case the fixture, which itself remains attached to reference surface 184 through beam 166, supplies the requisite structural integrity at the end of the truss structure. Such an arrangement may be used, for example, where the truss structure is utilized to deploy a payload such as sensors or solar collectors, which are mounted on the end of the structure where construction was initiated.

In the case where a payload is to be mounted on the end of the structure where construction is initiated, an initial group of frame elements may be preassembled to form an initial end of the structure and the payload joined thereto. Then the preassembled elements and payload are mounted on the construction fixture and upon commencement of the automated construction, the elements initially fed to the fixture are joined to the preassembled elements.

An automated construction method has been disclosed wherein the feeding of an element to the construction fixture includes an axial movement, through a distance F, of the feed unit feeding the element. However, it is the relative axial movement through distance F between the fixture and the feed unit that is necessary to accomplish the element feeding operation. Thus, the feeding of the element may be accomplished with equal effect by axially moving the fixture through the distance F while the appropriate feed unit remains stationary.

In the automated construction method disclosed herein, diagonal struts 62 are installed following construction of a truss structure of the desired length. Alternatively, this operation can be performed during construction by installing the diagonal struts on the portions of the truss structure that are periodically shifted in the forward axial direction off fixture 146.

While a preferred truss structure illustrated and described herein may have plane or puckered ends which include end struts joined to each of the two free vertex points, the invention is not so limited. It will be clear that the end struts at a plane or puckered end may be dispensed with and a payload which connects the free vertex points structurally may be substituted. In either case, the requisite structural integrity and stability are established.

Although frame feed units which utilize free wheeling belt units are preferred, forced driving means for the belts may become necessary. This is particularly the case where the individual stack sizes are anticipated to be large. Under those conditions, forced belt driving will facilitate the frame element feeding process.

The preferred embodiment of the truss structure disclosed herein employs substantially straight fixture pins with which to hold elements on the construction fixture. However, other types of pins may be used. For example, L-shaped pins with one leg perpendicular and the other parallel to a fixture plane could be employed. With such an arrangement, upon extension and rotation of the pin, it is the parallel leg which lies across a portion of the frame element which serves to hold the latter.

Another type of fixture pin which may be used is an expandible pin of the type commercially available as Expando Pin from Adjustable Bushing Corporation. The diameter of such a pin may be expanded or retracted by mechanical operation. Thus, if a substantially straight expandible pin is employed as a fixture pin, its diameter could be expanded after insertion into the mating fixture pin hole at the frame element vertex. This will result in a firm hold on the frame element. With such an arrangement, the diameter of the fixture pin must be reduced prior to pin withdrawal.

The construction methods and construction apparatus are disclosed herein in the construction of a truss structure in a gravity-free environment. However, the invention is not so limited and it will be understood that the aforesaid construction methods and apparatus therefor may also operate in a gravity environment.

While the preferred embodiment illustrated and described herein comprises specific materials, components, apparatus and methods, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for constructing an elongate prism-form truss structure having a square cross section from a plurality of planar, congruent, triangular frame elements, said structure being defined by four longitudinal edges parallel to a central longitudinal axis, said longitudinal edges defining structure planes therebetween, each of said frame elements having A-, B- and C-sides located opposite A-, B- and C-vertices, the dimensions of said sides of said elements being defined by:

COS α=NC/4B where
α=included angle between said B- and C-sides at said A-vertex,
α>90°,
B=length of B-side,
C=length of C-side, and
N=integer>1;
said elements being fed from four feed points radially spaced from said axis;
said method comprising the steps of:
(1) feeding said elements in a predetermined sequence from said fed points such that each element is placed into the confronting structure plane disposed between said feed point and said axis;
(2) joining each element to selected ones of the previously fed elements such that said C-sides align along said longitudinal edges; and
(3) repeating steps (1) and (2) until a structure of the desired length has been constructed.

2. The method of claim 1 and further including the step of installing a plurality of diagonal struts extending between diagonally opposite longitudinal structure edges, said struts intersecting said axis at points spaced along the latter.

3. The method of claim 1, wherein said elements are fed to a construction fixture from first, second, third and fourth stacks of said elements each located at one of said feed points, said first and second stacks and said third and fourth stacks respectively facing each other on opposite sides of said axis, said third and fourth stacks being displaced at a 90° angle around said axis with respect to said first and second stacks;
said fixture conforming substantially to the interior space of said structure under construction and being capable of axial movement relative thereto, said fixture including longitudinal edges parallel to and proximate the longitudinal edges of said structure under construction and defining fixture planes therebetween each confronting one of said stacks; and
said feeding step further including placing the frame element currently being fed into a construction position on said fixture such that said element is disposed in said confronting fixture plane with its C-side lying adjacent one of said longitudinal fixture edges.

4. The method of claim 3 wherein N is an even integer no greater than 4;
said first, second, third and fourth stacks mounted on first, second, third and fourth frame feed units respectively, each of said feed units comprising a base plate and substantially identical telescoping guide posts mounted perpendicularly thereon each adapted to selectively extend in length, said guide posts being positioned on said plate in a pattern conforming to said frame elements and being capable of holding a predetermined number of said frame elements in stacked relationship;
said fixture including means for holding a plurality of frame elements thereon;
each frame feeding operation from a selected stack further comprising the steps of:
selecting the top frame element of said stack with the free ends of the corresponding guide posts; and
extending said last-recited guide posts to place said selected element into its confronting construction position;
said predetermined feed sequence comprising the steps of:
feeding a first element from said third stack;
feeding a second element from said fourth stack;
engaging said first and second elements with said fixture holding means while said guide posts remain extended in order to retain said elements on said fixture;
withdrawing said guide posts from said first and second elements respectively;
moving said fixture in a forward axial direction by a distance T with respect to said feed units, where T is substantially equal in length to the C-side of an element;
feeding the top element from each of said first, second, third and fourth stacks in sequence;
joining each of the four last-fed elements to a previously fed element;
holding the four last-fed elements in construction position by maintaining the corresponding guide posts in their extended position;
disengaging said fixture holding means from said first and second elements;
moving said fixture in a backward axial direction by said distance T;
engaging said four last-fed elements with said fixture holding means;
withdrawing said guide posts from said four last-fed elements;
moving said fixture in said forward axial direction by said distance T; and
repeating the above-recited steps commencing with the feeding of the top frame element from said first stack.

5. The method of claim 4 wherein each of said feed units is adapted to move in an axial direction;
each of said frame elements including A-, B- and C-vertex fittings at the correspondingly designated vertices, said A-vertex fitting including a substantially cylindrical socket aligned with said C-side;
said B-vertex fitting including a fastening pin having an exposed portion extending outwardly therefrom and having an axis aligned with said C-side;
said C-vertex fitting including a tab extending outwardly therefrom, said tab including a through-hole having an axis substantially parallel to said C-side;
said method further comprising the steps of:
prior to feeding a given element from its stack, moving the corresponding feed unit in a backward axial direction with respect to said fixture by a distance F, where F exceeds the length of the exposed portion of said B-vertex fastening pin;
upon extending said guide posts with the currently fed element thereon, moving said corresponding feed unit in a forward axial direction by said distance F, said forward axial movement being effective to insert the B-vertex fastening pin of said currently fed element into the C-vertex throughhole of the previously fed element positioned on the adjacent face of said fixture nearest the C-side of said currently fed element, and thereafter to insert said pin into the A-vertex socket of the element previously fed from the same stack.

6. The method of claim 4 and further including the step of feeding an element from said first stack prior to feeding said first element from said third stack.

7. The method of claim 4 and further including the step of feeding an element from said second stack prior to feeding said first element from said third stack.

8. The method of claim 7 wherein:

$N=2$, $C=2B/\sqrt{3}$, and wherein each of the opposite terminating ends of said structure includes first and second free vertices;

said method further including the steps of:

interconnecting said first and second free vertices with a first end strut; and interconnecting said second free vertex to said structure with a second end strut.

9. The method of claim 4 and further including, prior to feeding said first element from said third stack, the steps of:

feeding an element from said first stack; and feeding an element from said second stack.

10. The method of claim 9 wherein:

$N=2$, $C=2B/\sqrt{3}$, and wherein each of the opposite terminating ends of said structure including first and second free vertices;

said method further including the steps of interconnecting said first free vertex with a junction of a pair of element vertices on said structure by means of a first end strut; and interconnecting said second free vertex with an additional junction of a pair of element vertices on said structure by means of a second end strut.

* * * * *

UNITED STATES PATENT AND TRADEMARK OFFICE
CERTIFICATE OF CORRECTION

PATENT NO. : 4,878,286

DATED : November 7, 1989

INVENTOR(S) : Anthony P. Coppa

It is certified that error appears in the above-identified patent and that said Letters Patent is hereby corrected as shown below:

Column 17, line 14, "$\alpha>90°$," should be --$\alpha<90°$,--.

Signed and Sealed this

Eighth Day of January, 1991

Attest:

HARRY F. MANBECK, JR.

*Attesting Officer*  *Commissioner of Patents and Trademarks*